United States Patent
Nakamura

(10) Patent No.: US 8,970,920 B2
(45) Date of Patent: Mar. 3, 2015

(54) IMAGE PROCESSING APPARATUS AND IMAGE PROCESSING METHOD

(71) Applicant: Canon Kabushiki Kaisha, Tokyo (JP)

(72) Inventor: Yasuyuki Nakamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/090,409

(22) Filed: Nov. 26, 2013

(65) Prior Publication Data
US 2014/0168730 A1   Jun. 19, 2014

(30) Foreign Application Priority Data
Dec. 18, 2012 (JP) ................. 2012-276117

(51) Int. Cl.
*H04N 1/04* (2006.01)
*H04N 1/047* (2006.01)
*H04N 1/12* (2006.01)

(52) U.S. Cl.
CPC ............... *H04N 1/047* (2013.01); *H04N 1/121* (2013.01)
USPC ............ 358/474; 358/498; 358/486; 382/104

(58) Field of Classification Search
CPC ....... H04N 11/20; H04N 1/047; H04N 1/121; H04N 1/2112; H04N 21/2221; H04N 21/2383; H04N 21/2385; H04N 21/2402; H04N 21/4184; H04N 21/4223; H04N 21/4334
USPC ................. 358/474, 498, 497, 496, 448, 488; 382/275, 170, 104, 299, 112
See application file for complete search history.

(56) References Cited

U.S. PATENT DOCUMENTS

| | | | |
|---|---|---|---|
| 6,266,441 B1 * | 7/2001 | Hashimoto et al. | 382/170 |
| 6,327,387 B1 * | 12/2001 | Naoi et al. | 382/190 |
| 6,594,401 B1 * | 7/2003 | Metcalfe et al. | 382/275 |
| 6,712,463 B2 * | 3/2004 | Matsumoto | 347/104 |
| 7,305,107 B2 * | 12/2007 | Harrington et al. | 382/112 |
| 7,391,885 B2 * | 6/2008 | Harrington et al. | 382/112 |
| 7,451,140 B2 * | 11/2008 | Purvis et al. | 1/1 |
| 8,285,080 B2 * | 10/2012 | Mizuno | 382/299 |

FOREIGN PATENT DOCUMENTS

JP    10-210288 A    8/1998

* cited by examiner

*Primary Examiner* — Negussie Worku
(74) *Attorney, Agent, or Firm* — Fitzpatrick, Cella, Harper & Scinto

(57) ABSTRACT

The apparatus of the present invention totalizes a frequency distribution while switching frequency distributions as targets, for each region having a set width, by using a sensor which captures document image data and a setting unit which sets a region width in accordance with frequency distribution generation targets. Upon detecting the trailing end of the document, the apparatus decides a remainder region which is not a totalization target in accordance with the remaining amount of image data of the document, and does not totalize any frequency distribution in the remainder region.

13 Claims, 20 Drawing Sheets

FIG. 9A
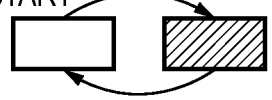
PROCESSING ORDER
FIG. 9B
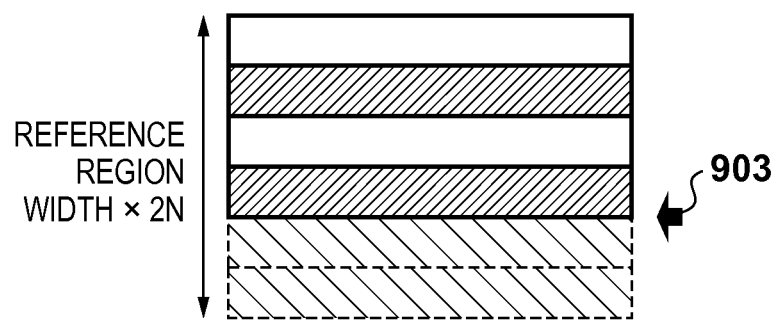

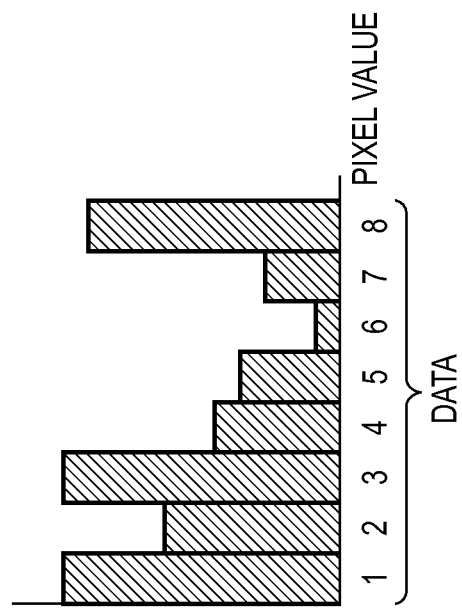
F I G. 10A
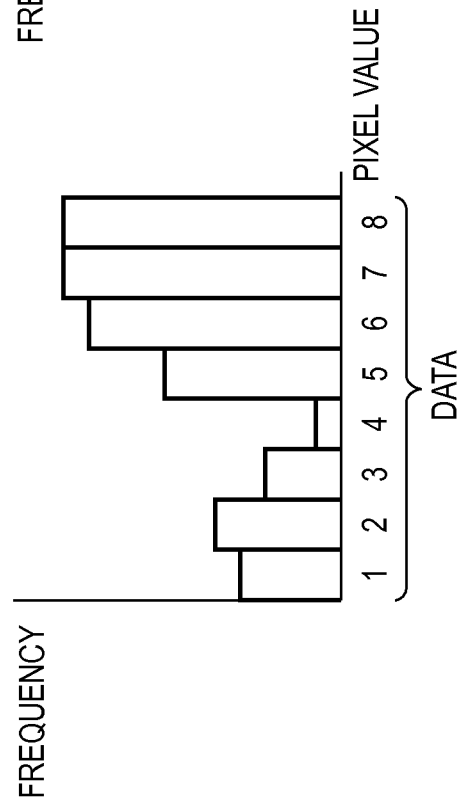
F I G. 10B

F I G. 11
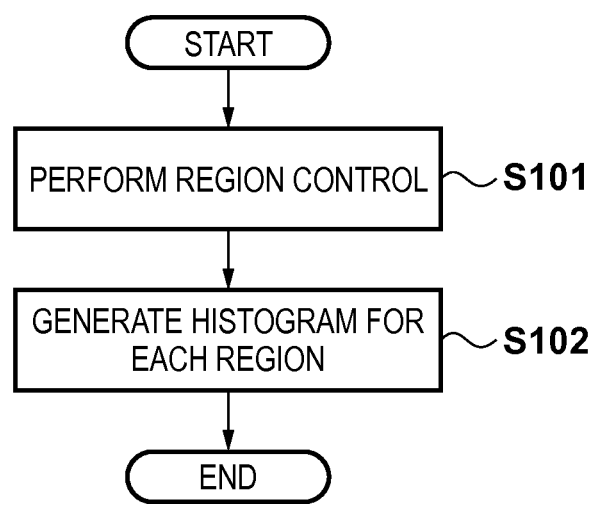

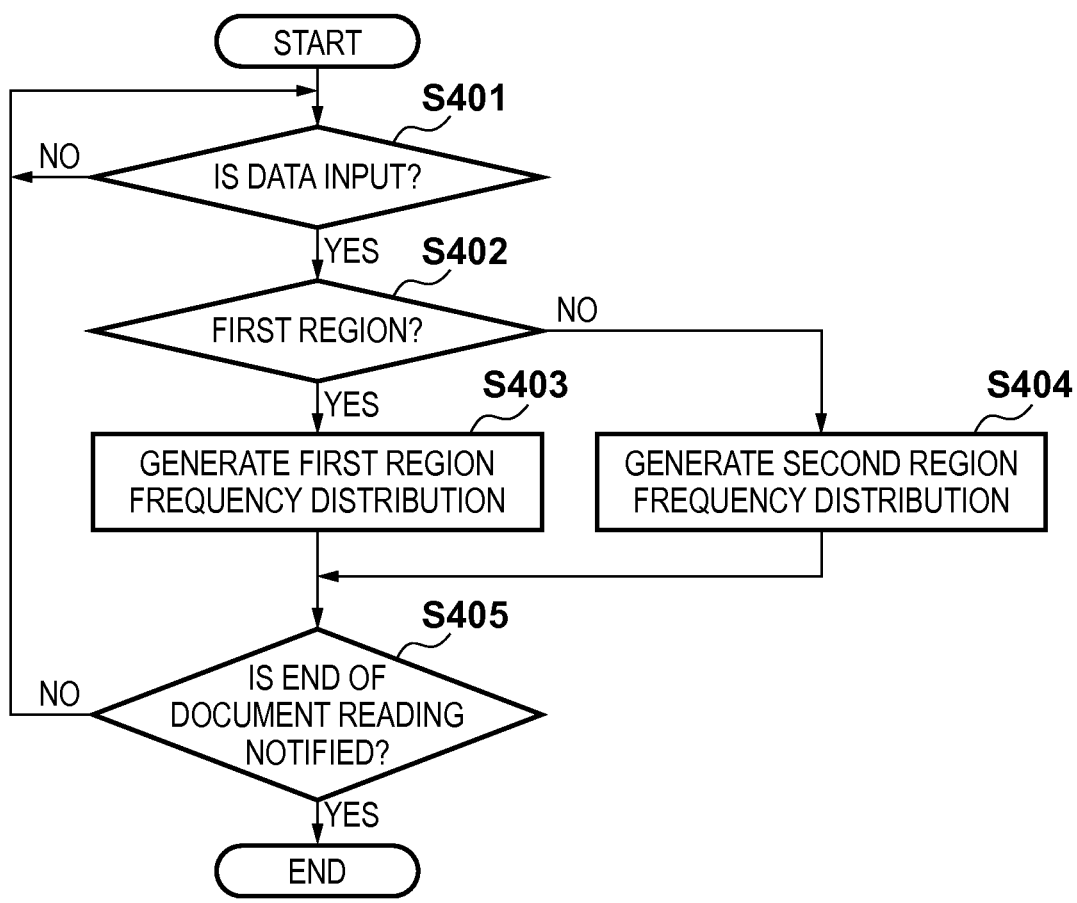
F I G. 14

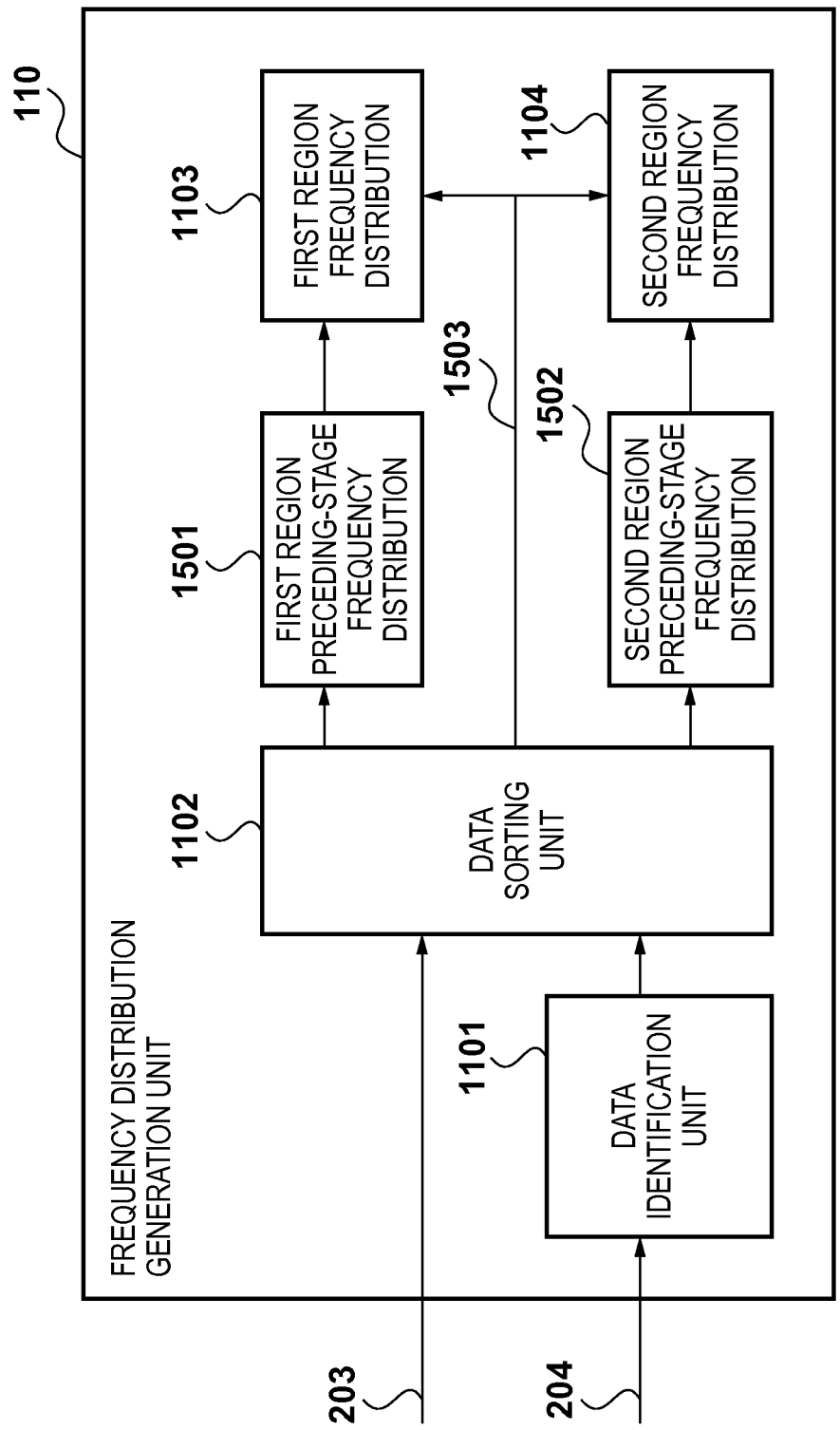

FIG. 16A
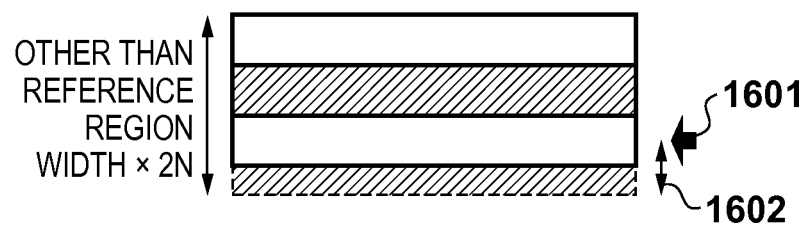
FIG. 16B
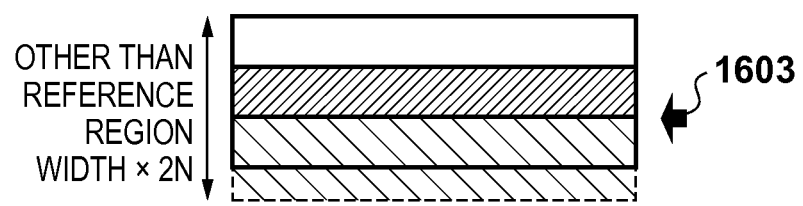

FIG. 20A
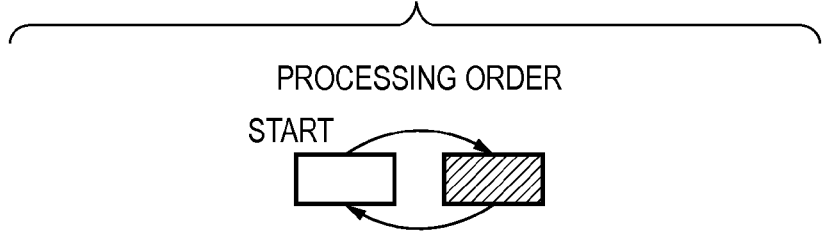
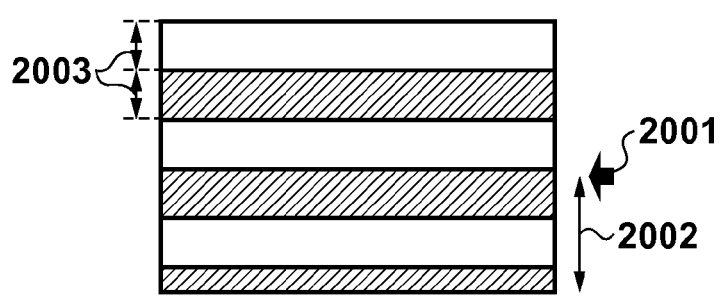
FIG. 20B
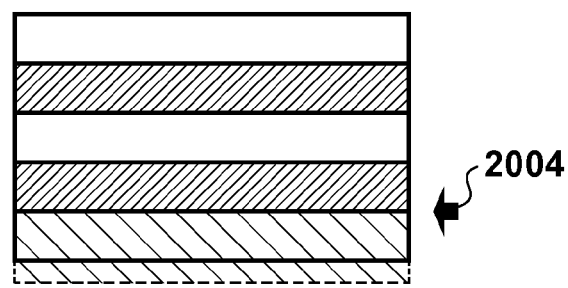
FIG. 20C
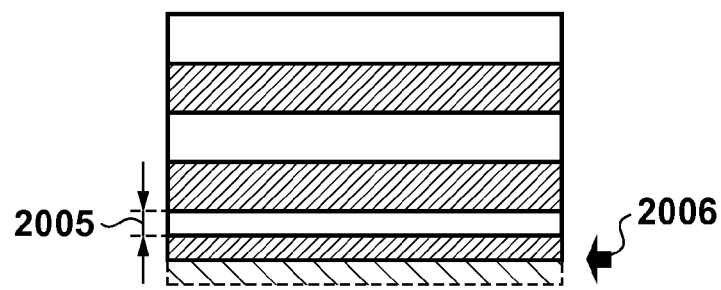

IMAGE PROCESSING APPARATUS AND IMAGE PROCESSING METHOD

BACKGROUND OF THE INVENTION

1. Field of the Invention

The present invention relates to an image processing technique of recognizing the characteristics of input image data by, for example, obtaining the frequency distribution of the input image data and, more particularly, to an image processing apparatus and image processing method for the technique.

2. Description of the Related Art

Conventionally, there is available a technique based on frequency distribution (histogram) generation as a method for recognizing the characteristics of image data captured by an imaging apparatus such as a CCD (Charge Coupled Device) or a CMOS (Complementary Metal Oxide Semiconductor). This method is characterized in analyzing the number of pixels existing in the input image data captured by an imaging apparatus for each tone of pixel values in the main scanning direction and sub-scanning direction of the image data. This method uses values for discriminating the characteristics of image data and values dependent on a system which analyzes image data as elements (the tones of pixel values) constituting a frequency distribution or the intervals between pixel positions where sampling is performed or both of them. Examples of analysis on images using frequency distributions include under color determination for read image data, color count determination for a document (color document/monochrome document), determination for the presence/absence of a content such as characters and thin lines, and blank page determination.

An analysis based on a frequency distribution is used to adopt image correction parameters suitable for a specific object included in an image or to identify the boundary between an object and a background. Japanese Patent Laid-Open No. 10-210288 discloses a technique of segmenting the image captured by an imaging apparatus into a plurality of small images, generating a histogram of the level distribution of pixel signals constituting each small image, and specifying a small image including the boundary between an object and a background.

In such a frequency distribution analysis for each pixel value, the size of the image data of an analysis target need to be determined in advance to decide the pixel position where sampling is performed and perform uniform segmentation for small regions.

When reading a document using an ADF (Automatic Document Feeder), the size of image data is generally determined for the first time when the feeder completely reads one page of the document. It is therefore essential to store image data corresponding to one page. This requires a resource such as a memory or the like. In addition, a frequency distribution analysis is performed for the first time after the storage of image data corresponding to one page, and subsequent image processing is performed based on the analysis result. For this reason, a document reading process, a frequency distribution analysis process, and a subsequent image process constitute a critical path for processing corresponding to one page. This is a factor that determines a total processing time.

Attaching a sensor for document size detection to an ADF can detect a document size before reading operation. This, however, leads to a cost increase corresponding to the sensor. In addition, if document pages having different sizes are stacked in a mixed state, some sensor may detect a uniform size different from actual document sizes.

SUMMARY OF THE INVENTION

The present invention provides an image processing apparatus and image processing method which properly execute an analysis on a frequency distribution even if no document size is informed in advance.

The present invention has the following arrangement. That is, an image processing apparatus comprising: a reading unit configured to read a document from an end portion of the document for each line in a predetermined direction and outputs image data; a detection unit configured to detect a size of the document in the predetermined direction; an obtainment unit configured to obtain a frequency distribution of pixel values by using output image data, for each reference region having a predetermined width in the predetermined direction, while reading the document by using the reading unit; a totalization unit configured to segment a frequency distribution obtained by the obtainment unit for each of the reference regions into a predetermined number of groups, and totalizes and stores the frequency distribution for each of the groups; a control unit configured to control totalization by the totalization unit, upon detection of a size of the document by the detection unit, so as to equalize the numbers of the reference regions sorted to the respective groups by using the size of the document, a width of the reference region, and the number of the groups; and an analysis unit configured to analyze the input image data by using a frequency distribution stored for each group which is totalized by control by the control unit.

According to the above arrangement, it is possible to perform a proper frequency distribution analysis even on image data whose image size is not determined. This makes it possible to concurrently perform image data reading and a frequency distribution analysis, thereby contributing to an increase in processing speed. In addition, if the only purpose is to perform a frequency distribution analysis, there is no need to store read image data.

Further features of the present invention will become apparent from the following description of exemplary embodiments with reference to the attached drawings.

BRIEF DESCRIPTION OF THE DRAWINGS

FIGS. 9A and 9B are views showing a frequency distribution generation target region (the region width 2N) in the first embodiment;

FIGS. 10A and 10B are graphs showing the arrangements of first and second region frequency distributions;

FIG. 11 is a flowchart showing an overall control procedure in the apparatus;

FIG. 14 is a flowchart showing a control procedure for a frequency distribution generation unit 110 in the first embodiment;

FIG. 15 is a block diagram showing the arrangement of a frequency distribution generation unit 110 in the second embodiment;

FIGS. 16A and 16B are views showing a frequency distribution generation target region (other than a region width 2N) in the second embodiment;

FIGS. 20A, 20B, and 20C are views each showing a frequency distribution generation target region in the third embodiment;

DESCRIPTION OF THE EMBODIMENTS

[First Embodiment]
<Arrangement of Image Processing Apparatus>

Figure 1A:
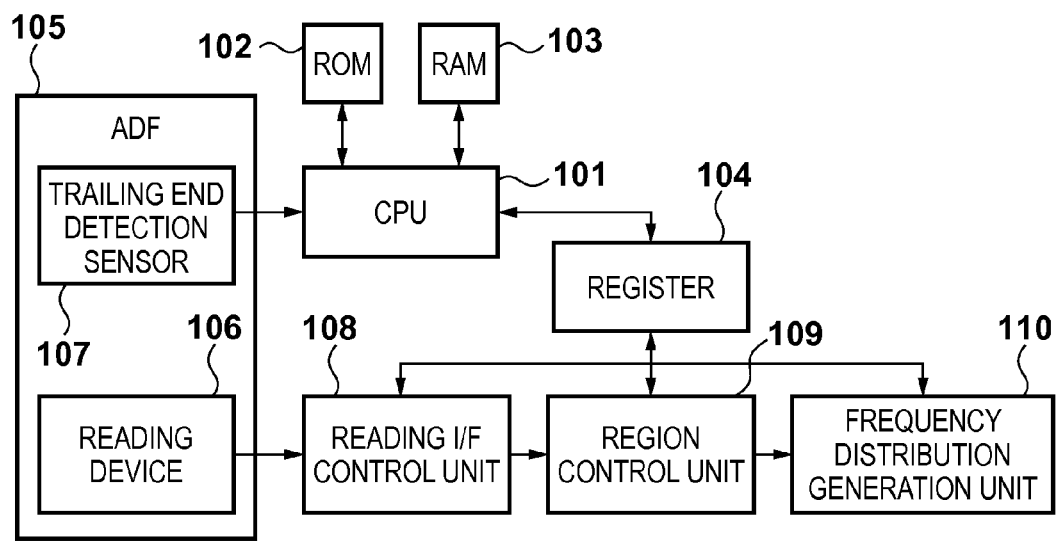
FIGS. 1A and 1B are block diagrams showing the overall arrangement of an apparatus.
Figure 1B:
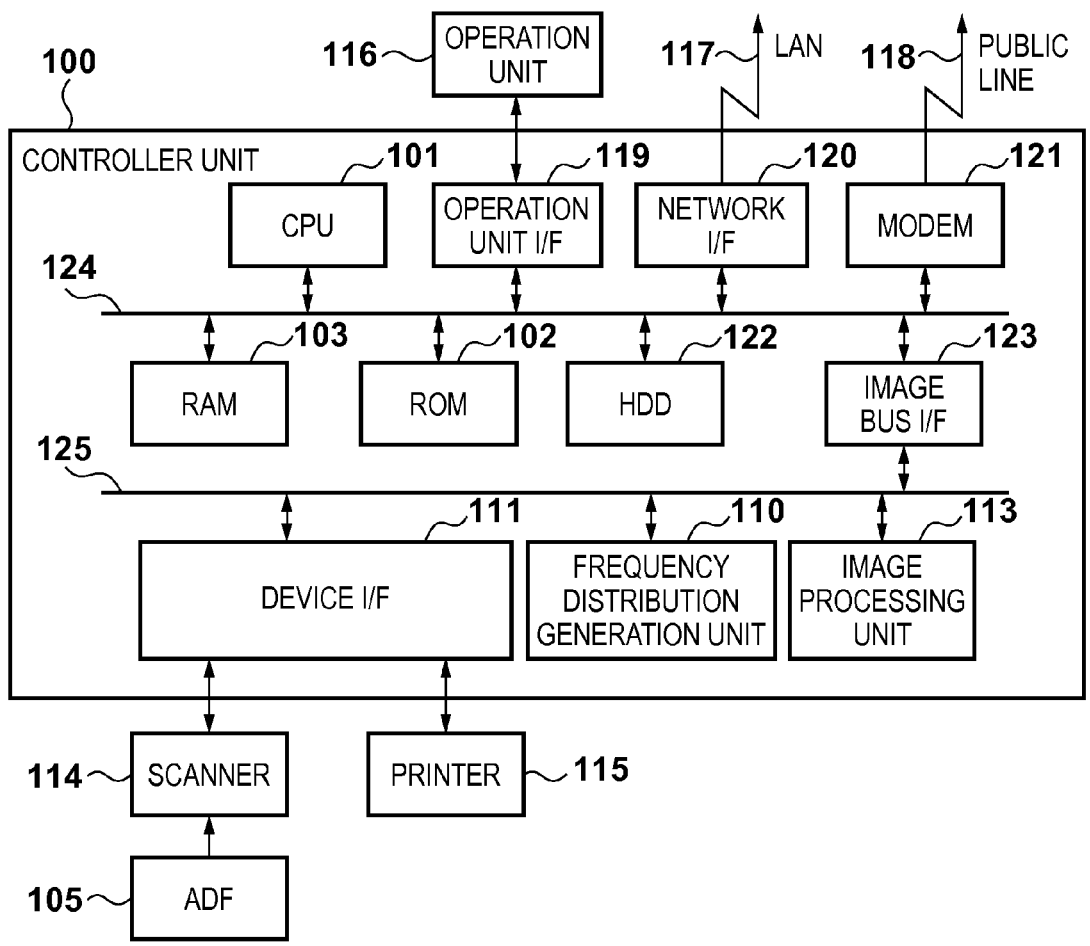

The embodiments of the present invention will be described below with reference to the accompanying drawings. FIGS. 1A and 1B are block diagrams showing the arrangement of an image processing apparatus (FIG. 1B) according to an embodiment and the arrangement of a frequency distribution generation unit (FIG. 1A) arranged in the apparatus. Referring to FIG. 1B, a controller unit 100 is a controller which is connected to a scanner 114 as an image input unit and a printer 115 as an image output unit. The controller 100 is also connected to a LAN 117 or public line 118 to input and output image data and device information. An ADF (Automatic Document Feeder) 105 is attached to the scanner 114. A CPU 101 functions as a controller which controls the overall digital multifunction peripheral as an image processing apparatus. A RAM (Random Access Memory) 103 temporarily stores control data or is used as a work memory under the control of the CPU 101. A ROM (Read Only Memory) 102 stores programs executed by the CPU 101. An HDD (Hard Disk Drive) 122 stores system software, image data, and the like. An operation unit I/F 119 is an interface unit for an operation unit 116 and outputs image data to be displayed on the operation unit 116 to it. The operation unit I/F 119 also functions to transfer the information input by the user from the operation unit 116 to the CPU 101. A network I/F 120 is connected to the LAN 117 to input and output information. A modem 121 is connected to the public line 118 to perform modulation/demodulation processing for data transmission/reception. The above components are arranged on a system but 124. An image bus I/F 125 is a bus bridge which connects the system but 124 to an image bus I/F 123 which transfers image data at high speed, and converts a data structure. The image bus I/F 123 is formed from a fast bus such as a PCI bus or IEEE1394 bus. A device I/F 111 connects the scanner 114 and the printer 115, which are image input/output devices, to the controller 100 to perform synchronous system/asynchronous system conversion of image data. The device I/F 111 includes a reading I/F control unit 108 which converts the signal output from the reading device into digital data and a region control unit 109 which, for example, decides the size of image data. A frequency distribution generation unit 110 generates the frequency distribution, that is, the histogram, of the luminances of the pixels of the image data input by the scanner 114. An image processing unit 113 performs correction, processing, and editing for the image data input by the scanner 114 based on, for example, a histogram, and performs processing suitable for subsequent print output or image transmission. The image processing unit 113 performs correction, resolution conversion processing, and the like in accordance with the printer 115.

FIG. 1A shows a detailed arrangement associated with frequency distribution generation. An illustration of some of the buses, interfaces, and the like is omitted in FIG. 1A. A register 104 is set by the CPU 101 and holds the operation mode of the frequency distribution generation unit or an instruction concerning control. The ADF 105 feeds document pages stacked on the mount table to the document glass plate one by one. The ADF 105 includes, at a predetermined detection position, a trailing end detection sensor 107 which detects the trailing end of a document page at the time of reading operation. A reading device 106 such as a CCD or CMOS reads the document page conveyed on the document glass plate at a reading position spaced apart from the detection position by a predetermined distance, and transmits the resultant image data to the frequency distribution generation unit 110. The RAM 103, the HDD 122, or the like stores the data, as needed. Although FIG. 1A shows the reading device 106 as if it were part of the ADF 105, the reading device 106 is a device belonging to the scanner 114. The trailing end detection sensor 107 is spaced apart from the mount position of a document page by a predetermined distance in a predetermined conveying direction, and hence can also detect the leading end of the document as well as the trailing end. Since the conveying speed is determined, it is possible to decide the document size in the conveying direction from the detection results on the leading and trailing ends. That is, the trailing end detection sensor can be regarded as an end portion detection sensor.

Figure 6:
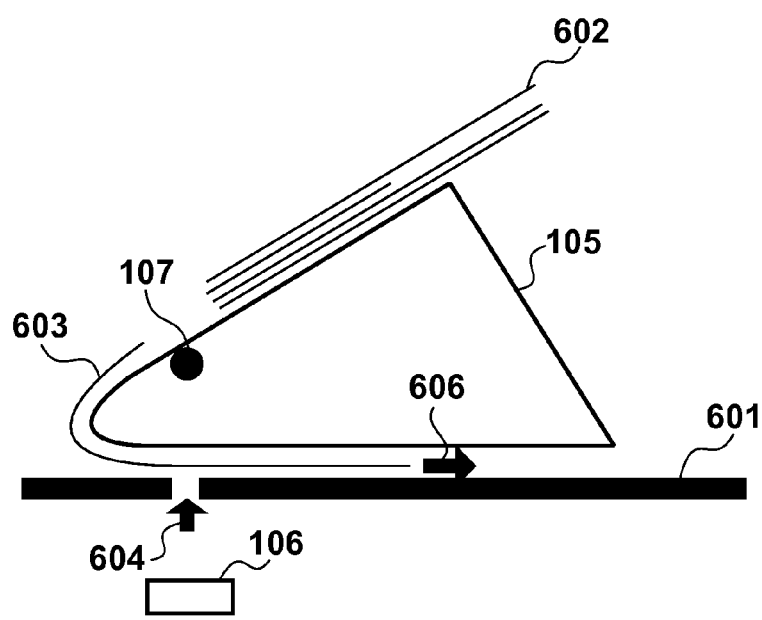
FIG. 6 is a view showing the arrangement of an ADF 105.
Figure 7:
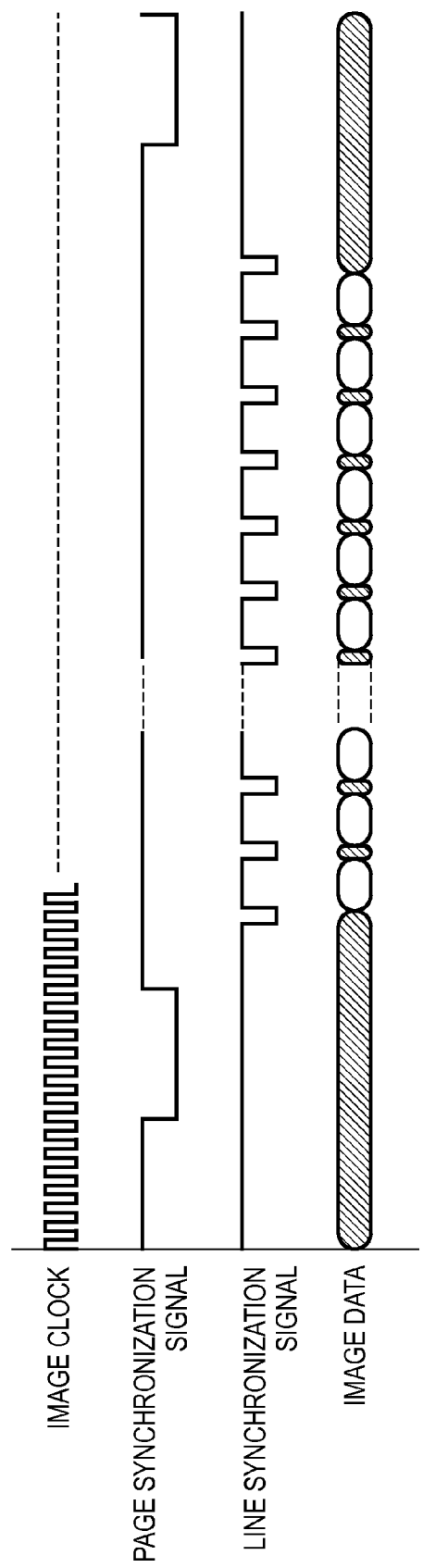
FIG. 7 is a chart showing an example of a synchronization signal.

FIG. 6 shows the schematic arrangement of the ADF 105. The same reference numerals as in FIG. 6 denote the same components in FIGS. 1A and 1B. A document glass plate 601 is a glass plate on which a document is mounted and which is provided on the image processing apparatus. A document 602 is a document bundle constituted by document pages having different sizes set on the installation portion of the ADF 105. The page located at the bottom of the document 602 is conveyed onto the document glass plate 601 by rollers and the like (not shown). A document page 603 is a document page image data on which is being read and which is conveyed by document convey units such as rollers in the ADF 105 (not shown) in the direction indicated by reference numeral 606 in FIG. 6. The reading device 106 reads the document page 603 at a reading position 604. The trailing end detection sensor 107 detects the trailing end position of the document page 603 and notifies the CPU 101 of the detection result. That is, the CPU 101 can detect the trailing end position of the image on the document page 603 during reading operation when the trailing end of the document page 603 is conveyed to a position passing through the trailing end detection sensor 107. At this time point, the portion of the image printed on the document page 603 which has not been read corresponds to the range from the position of the trailing end detection sensor 107 to the reading position 604. Since the range from the position of the trailing end detection sensor 107 and the reading position 604 is uniquely obtained based on the mechanical arrangement of the image processing apparatus, the number of lines of the document image data defining this range is determined in accordance with the distance from the position of the trailing end detection sensor 107 to the reading position 604 and the conveying speed of the document page. That is, it is possible to decide the length of a document page (that is, the length in the sub-scanning direction) when the trailing end detection sensor 107 detects the trailing end of the document page 603. Note that the number of lines sometimes changes in accordance with the conveying speed of a document page. For example, when reading a document page at a resolution of 600 dpi and at a resolution of 300 dpi in the conveying direction, since the ratio between the conveying speeds is two to one, the number of lines in the interval from the position of the trailing end detection sensor 107 to the reading position 604 of the reading device 106 changes. For this reason, the CPU 101 controls frequency distribution generation processing upon managing the number of lines in accordance with the reading resolution of a document image in the sub-scanning direction by the ADF 105. When feeding a document bundle having a constant width like a document including both A4 and A3 pages, it is possible to specify the widthwise direction of the document by detecting the position of a regulation plate which is set in accordance with the width of a document page and prevents a shift of the document page in the widthwise direction. Obviously, this apparatus may include a mechanism for detecting the width of each document page itself by using a mechanical or optical sensor. Refer back to the arrangement of the frequency distribution generation unit shown in FIGS. 1A and 1B. The reading I/F control unit 108 receives the analog image data read by the reading device 106 and outputs the data to the subsequent-stage processing unit. That is, the reading I/F control unit 108 has a function of converting the analog image data output from the reading device 106 into digital image data and outputting the converted digital image data to the subsequent-stage processing unit. Note that the data output to the subsequent-stage processing unit includes both digital image data and a synchronization signal which allows control of read image data. FIG. 7 shows an example of this synchronization signal. FIG. 7 indicates that the apparatus outputs a page synchronization signal (negative logic) as the reading start timing of a document image and a line synchronization signal (negative logic) as a reading line start timing, together with image data (the hatched portions are ineffective image data).

Figure 3:
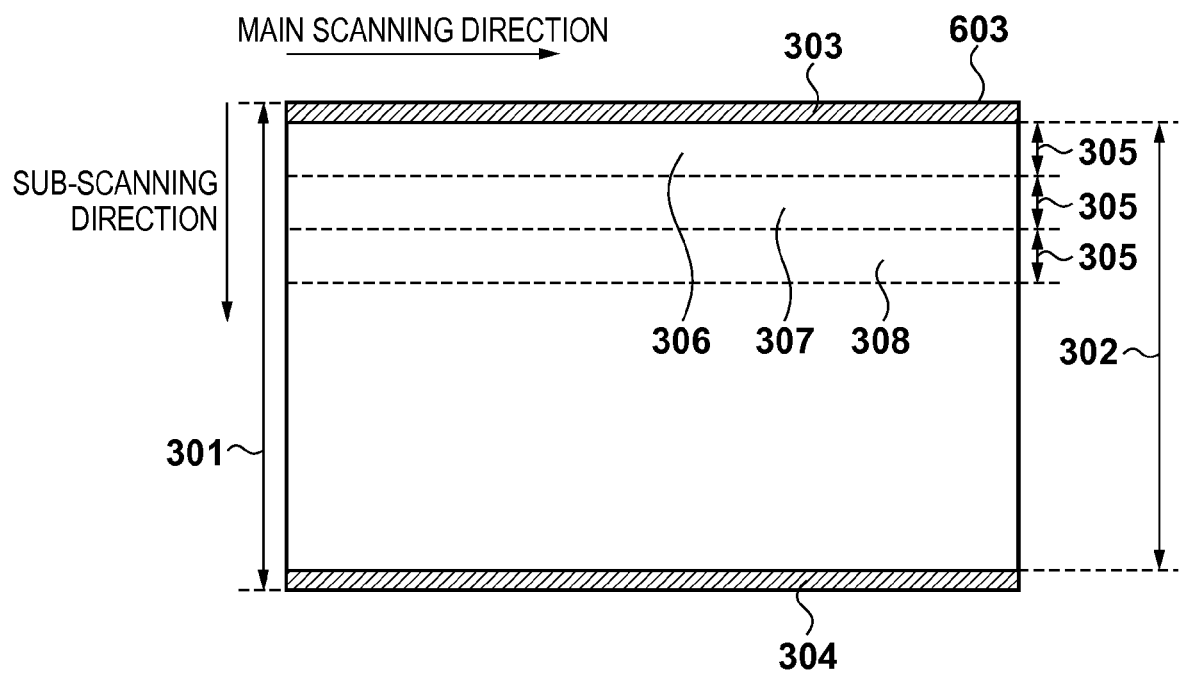
FIG. 3 is a view showing region segmentation of a read document page.

The region control unit 109 controls a region for frequency distribution generation based on the image data and synchronization signal output from the reading I/F control unit 108. When reading the document page 603 by using the ADF 105, the detection of the leading and trailing ends of the document page depends on the conveying arrangement for the document page 603 and the light source arrangement of the reading device 106. For this reason, the apparatus sometimes cannot accurately detect an end portion and erroneously detects the shadows of a document. FIG. 3 shows this situation. Referring to FIG. 3, an overall line count 301 indicates the number of pixels of a document image in the sub-scanning direction, and a effective line count 302 indicates the number of pixels of a portion in the sub-scanning direction which is free from the influence of the shadows formed at the leading and trailing ends of a document page by the light source at the time of reading operation. In addition, a shadow portion 303 is the leading end shadow portion of the document page 603 and a shadow portion 304 is a trailing end shadow portion at the time of reading operation. The effective line count 302 is the line count obtained by subtracting the line counts of the shadow portions 303 and 304 from the overall line count 301. As described above, the regions of the image data read by the ADF 105 which correspond to the leading and trailing end portions of the document page sometimes include shadow data. Using values other than the image data printed on a document page will interfere with an accurate analysis after frequency distribution generation. It is therefore necessary to perform control so as not to set these shadow portions as frequency distribution generation targets.

Figure 2:
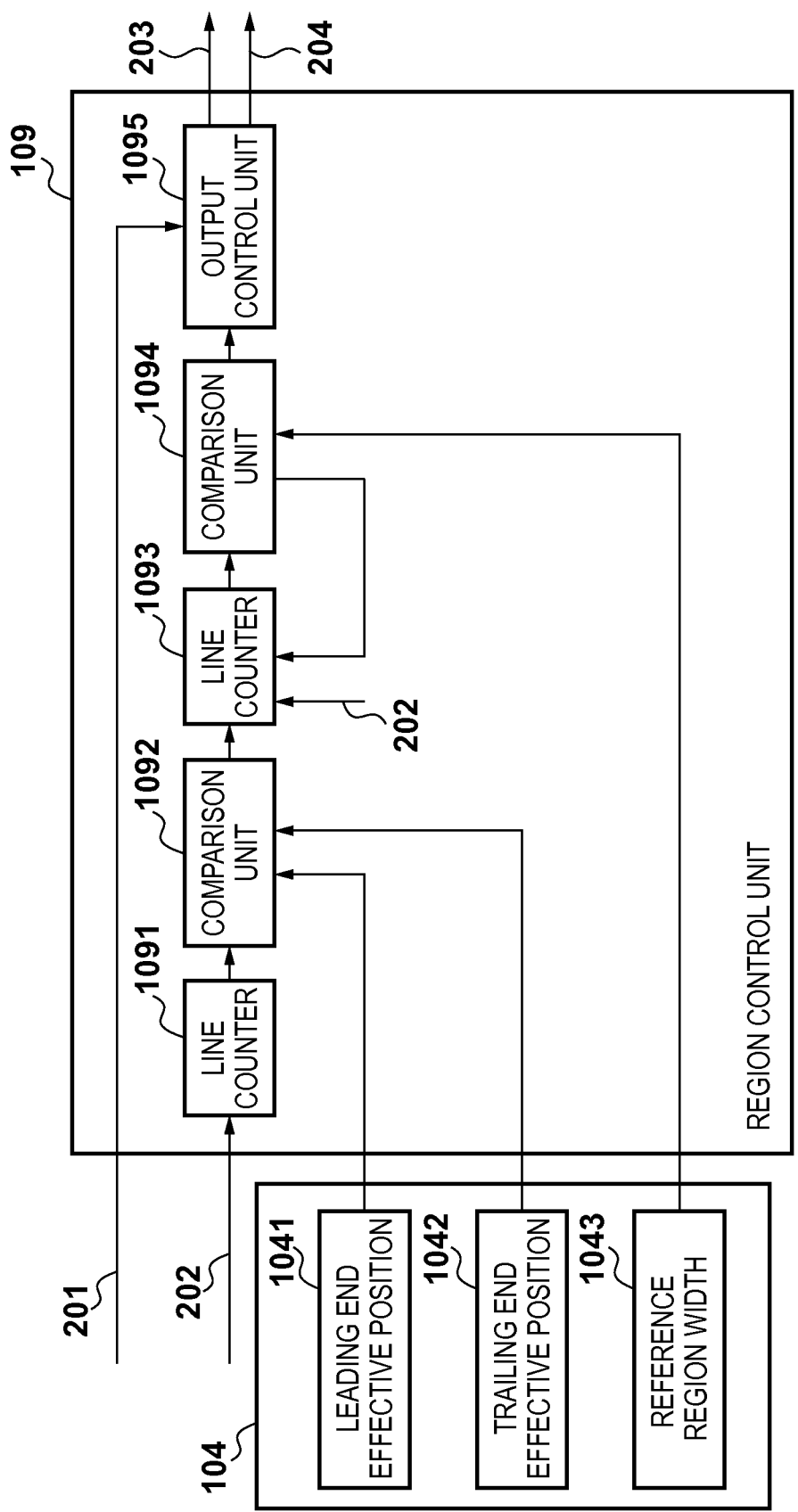
FIG. 2 is a block diagram showing the arrangement of a region control unit 109.

The region control unit 109 performs control so as not to output any image data of such shadow portions for subsequent-stage processing. FIG. 2 shows the detailed arrangement of the region control unit 109. The same reference numerals as in FIG. 2 denote the same components in FIGS. 1A and 1B. Referring to FIG. 2, image data 201 is the image data output from the reading I/F control unit 108, and a synchronization signal 202 is the synchronization signal (line synchronization signal) in the sub-scanning direction which is output together with the image data. A register 1041 holds the leading end effective position of document image data. A register 1042 holds the trailing end effective position of the document image data. A register 1043 holds a reference region width for the acquisition of a frequency distribution. A reference region is a band obtained by segmenting image data into congruent shapes parallel to the main scanning direction. The length of the band in the sub-scanning direction is a reference region width. Note that the leading end effective position 1041, the trailing end effective position 1042, and the reference region width 1043 which are held in the registers are predetermined widths set by the CPU 101. A first line counter 1091 is a line counter which is arranged in the region control unit 109 and counts the number of lines of image data input based on the synchronization signal 202. A first comparison unit 1092 compares the count value of the first line counter 1091 with the leading end effective position 1041, and the count value of the first line counter 1091 with the trailing end effective position 1042, thereby determining a region free from the influence of shadows, that is, a effective region obtained by subtracting the shadow portions 303 and 304 in FIG. 3 from one-page image data corresponding to the overall scanned document page 603. Therefore, the number of lines of the shadow portion 303 is set at the leading end effective position 1041. For example, this value can be empirically decided in advance. In addition, the value obtained by subtracting the number of lines of the shadow portion 304 from the overall line count 301 is set at the trailing end effective position 1042. The overall line count 301 can be determined at the time of the detection of the trailing end of the document page by the trailing end detection sensor 107, and the number of lines of the shadow portion 304 is decided in advance. It is therefore possible to set the value of the trailing end effective position 1042 at the time of the trailing end of the document page by the trailing end detection sensor 107.

The region control unit 109 performs region control for frequency distribution generation based on the set value of the reference region width 1043. The set value of the reference region width 1043 is reflected in a width 305 in FIG. 3 and can be decided in advance. The region control unit 109 switches regions for frequency distribution generation, with the reference region width 1043 being a unit. Assume that the region control unit 109 performs control to generate (totalize) the frequency distributions of two regions by sampling the same number of pixels in the respective regions at the same intervals. In this case, the region control unit 109 alternately switches the first and second regions for each reference region width and totalizes the frequency distributions of pixel values in the respective regions. For example, the region control unit 109 controls totalization to set the frequency distribution of a region 306 as the frequency distribution of a first region, that is, a first frequency distribution, and controls totalization to set the frequency distribution of a next region 307 as the frequency distribution of a second region, that is, a second frequency distribution. In this example, the region control unit 109 performs control to set the frequency distribution of a subsequent region 308 as a first frequency distribution to generate the frequency distributions of the two regions which alternately appear in the sub-scanning direction. Note that the number of regions for frequency distribution generation is not limited to two in the sub-scanning direction and may be three or more. That is, it is possible to segment an image into reference regions (bands) parallel to the main scanning direction, classify them into N types of totalization target regions, and totalize a frequency distribution for each totalization target region, that is, a frequency distribution for each pixel value. In this case, the numbers of pixels sampled for the totalization of frequency distributions are the same in all the reference regions (at least almost the same). Pixels to be sampled may be all pixels, selected at predetermined intervals in a raster order, or selected at predetermined intervals in the main scanning and sub-scanning directions. When, for example, generating frequency distributions in three types of reference regions, the region control unit 109 performs region control to set the frequency distribution of the region 308 as a third frequency distribution, and performs control to set the frequency distribution of the next region as a first frequency distribution.

Figure 4:
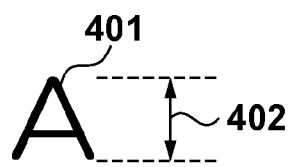
FIG. 4 is a view showing an example of a detection target for frequency distribution generation.

The set value of the reference region width 1043 is set in accordance with a detection target in the frequency distribution generation unit. For example, when analyzing the presence/absence of character data in document image data, the region control unit 109 decides the set value of the reference region width 1043 in accordance with the font size of target character data and a reading resolution. FIG. 4 shows an example of this setting. Referring to FIG. 4, a character 401 indicates a character in 10.5 pt, and a pixel count 402 indicates the number of pixels of the character 401 in the sub-scanning direction. If the reading device 106 has a reading resolution of 600 dpi, the pixel count 402 in the sub-scanning direction which forms the character 401 in 10.5 pt shown in FIG. 4 is approximately 88. The reference region width 1043 in this case, therefore, is set to 64 which is a power of 2 in the neighborhood of 88 pixels. According to the above description, the reference region width is set to a power of 2 for the simplification of the processing arrangement in consideration of the hardware arrangement and control. However, the set value of the reference region width 1043 in this embodiment is not limited to this value. That is, it is possible to use sub-scanning pixel values constituting a detection target without any change or the multiplication or division result with a predetermined coefficient.

<Region Classification Control>

The region control unit 109 performs control based on the reference region width 1043 by using a line counter 1093, a comparison unit 1094, and an output control unit 1095 in FIG. 2. Although not shown, when detecting the leading end portion of a document page, the region control unit receives a reset signal to start line counting. Assume that the detection signal based on a document leading end portion is input with a delay or the like, as needed, to synchronize with the start of input of the line synchronization signal 202. The line counter 1091 counts the number of pulses of the line synchronization signal 202 input after resetting and inputs the resultant value to the comparison unit 1092. If the line counter value matches the leading end effective position 1041, the comparison unit 1092 inputs a signal representing the match (reset signal) to the line counter 1093. The line counter 1093 is reset by the signal representing the match from the comparison unit 1092 and the signal representing the match from the comparison unit 1094 on the subsequent stage to resume counting. That is, the line counter 1093 starts counting upon receiving a determination result on the leading end of the effective region obtained by eliminating the influence of the shadow portion 303 by the comparison unit 1092. That is, the line counter 1093 performs counting operation for only an interval corresponding to the effective region. The comparison unit 1094 compares the count value of the line counter 1093 with the set value of the reference region width 1043. If the count value of the line counter 1093 matches the reference region width 1043, the comparison unit 1094 outputs a control signal for switching regions as frequency distribution totalization targets to the output control unit 1095. At the same time, the comparison unit 1094 outputs a reset (load) signal for causing the line counter 1093 to start counting from the initial state. Upon receiving the reset (load) signal from the comparison unit 1094, the line counter 1093 returns the count value to the initial value, and performs counting upon receiving the line synchronization signal 202 again. The output control unit 1095 outputs a signal for controlling first frequency distribution totalization target regions to the processing unit on the subsequent stage until it receives the frequency distribution switching signal output from the comparison unit 1094. That is, the output control unit 1095 outputs, as output image data 204, a region identification signal 203 indicating a first frequency distribution totalization target region and the image data 201 input from the reading I/F control unit 108. In this case, the image data output from the output control unit 1095 belongs to the region indicated by the region identification signal. That is, since the two signals need to be synchronous, the output control unit 1095 gives a proper delay to the image data. Upon receiving a frequency distribution switching signal from the comparison unit 1094, the output control unit 1095 switches the region identification signal 203 to a signal indicating a second frequency distribution totalization target region and outputs the signal. That is, the output control unit 1095 performs this control to accumulate the frequency distributions of the region 306 in FIG. 3 as the first frequency distribution, and the frequency distributions of the region 307 as the second frequency distribution. The output control unit 1095 performs control to accumulate the frequency distributions of the subsequent region 308 as the first frequency distribution. In this manner, the output control unit 1095 totalizes frequency distributions while alternately switching the first and second frequency distribution totalization target regions. Note that the detailed operation control of the region control unit 109 will be described later by using other drawings.

<Frequency Distribution Generation Unit>

The frequency distribution generation unit 110 totalizes and generates frequency distributions for two types of regions segmented in the sub-scanning direction. The frequency distribution generation unit 110 generates a frequency distribution by using the region identification signal 203 and output image data 204 output from the region control unit 109.

Figure 5:
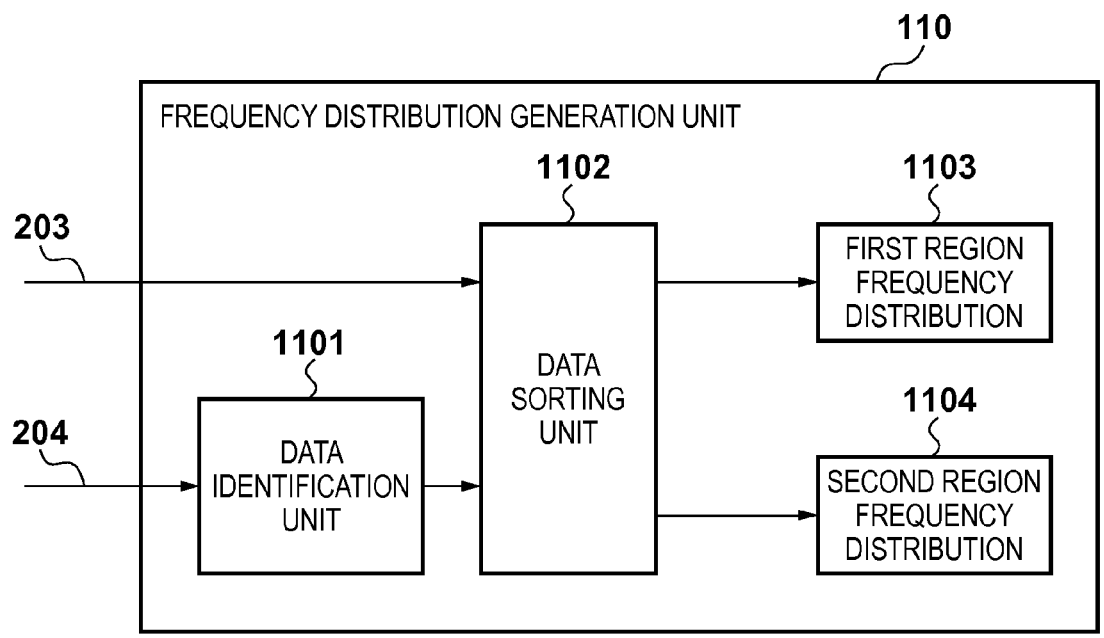
FIG. 5 is a block diagram showing the arrangement of a frequency distribution generation unit 110 in the first embodiment.

Although this embodiment will exemplify frequency distribution generation for two types of regions segmented in the sub-scanning direction, the embodiment is not limited to this, as described with reference to the region control unit 109. That is, if the regions indicated by the region identification signal 203 are three types of regions segmented in the sub-scanning direction, the frequency distribution generation unit 110 is also configured to generate frequency distributions of the three regions accordingly. FIG. 5 shows the internal arrangement of the frequency distribution generation unit 110. Referring to FIG. 5, a data identification unit 1101 refers to the value of the image data 204 and outputs the value to the subsequent stage. Assume that the image data 204 is constituted by 8 bits per pixel, that is, has 256 tones, and a frequency distribution is to be quantized and generated into 32 tones (5 bits). In this case, the data identification unit 1101 outputs the upper 5-bit value of each pixel value, from which the lower 3-bit value is removed, to the subsequent stage. It is possible to determine the degree of quantization in advance and make it programmable. A data sorting unit 1102 reflects the quantized image data output from the data identification unit 1101 in frequency distributions on the subsequent stage in accordance with the region identification signal 203. For example, if the region identification signal 203 indicates a first region, the data sorting unit 1102 reflects the frequencies of the pixel values represented by quantized image data in a first region frequency distribution 1103. If the region identification signal 203 indicates a second region, the data sorting unit 1102 reflects the frequencies of the pixel values represented by the quantized image data in a second region frequency distribution 1104. The first region frequency distribution 1103 and the second region frequency distribution 1104 store the frequency distributions of the respective regions.

<Data Identification Unit>

The concrete operation of the data sorting unit 1102 will be described next. The region 306 in FIG. 3 is a first region in the effective region. Therefore, the data sorting unit 1102 sorts the frequencies of values represented by image data belonging to the region 306, and reflects them in the first region frequency distribution 1103. More specifically, the data sorting unit 1102 adds 1 to the frequency of the density, of the frequency distribution stored in the first region frequency distribution 1103, which is represented by image data. The region 307 is a second region of the effective region. Therefore, the data sorting unit 1102 sorts the frequencies of the values represented by the image data belonging to the region 307, and reflects the resultant data in the second region frequency distribution 1104. More specifically, the data sorting unit 1102 adds 1 to the frequency of the density, of the frequency distribution stored in the second region frequency distribution 1104, which is represented by image data. The subsequent region 307 is a third region of the effective region. In this embodiment, to generate frequency distributions of two regions in the sub-scanning direction, the data sorting unit 1102 reflects the value indicated by the image data belonging to the third region in the first region frequency distribution 1103.

Figure 8A:
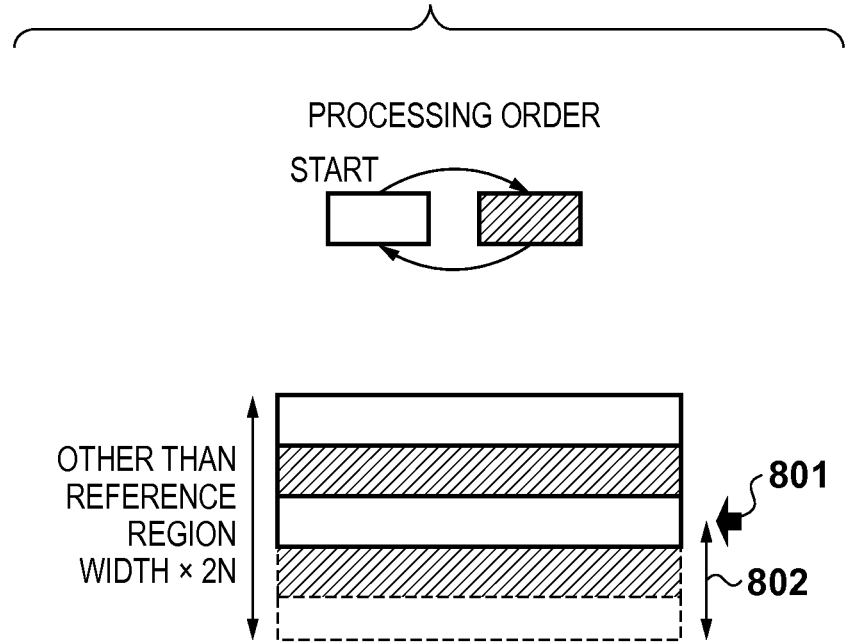
FIGS. 8A and 8B are views showing a frequency distribution generation target region (other than a region width 2N) in the first embodiment.

Region control by the region control unit 109 and the operation of the frequency distribution generation unit 110 will be described in more detail. FIG. 8A shows the concept of a case in which the number of lines of a effective region is not 2N times (N is an integer equal to or more than 1) the set value of the reference region width 1043. That is, the number of lines in the effective region is not an odd-number multiple of the reference region width in this case. FIG. 8A also shows a state in which the distance from the position of the trailing end detection sensor 107 to the reading position of the reading device 106 at this time exceeds two times the set value of the reference region width 1043 when converted into the number of lines. Assume that in FIG. 8A, each white rectangular region indicates a region the data acquired from which is reflected in the first region frequency distribution 1103, and each black rectangular region indicates a region the data acquired from which is reflected in the second region frequency distribution 1104. Assume that the region control unit 109 starts region switching from a white rectangular region. That is, the following description is based on the assumption that the region control unit 109 subsequently alternately switches black and white rectangular regions in the order named.

Referring to FIG. 8A, an arrow 801 indicates the line read by the reading device 106 at the timing when the trailing end detection sensor 107 has detected the trailing end of a document page. In this embodiment, the amount of image data belonging to the interval from the position of the trailing end detection sensor 107 to the reading position 604 is equal to or more than two times the set value of the reference region width 1043, and hence the apparatus reads image data corresponding to a portion denoted by reference numeral 802.

At the timing when the trailing end detection sensor 107 has detected the trailing end of a read document page, the read line is the one at the position 801, and a frequency distribution generation target is a white rectangular region. That is, the frequency distribution of the image is the timing reflected in the first region frequency distribution 1103. In order to equalize the number of pixels sampled in the two types of regions, namely the first and second regions, it is necessary to generate the second region frequency distribution 1104 by using the image data belonging to the next black rectangular region, that is, the second region. The image processing apparatus uses a frequency distribution to determine the attribute type of a document page. For example, the apparatus sometimes determines whether read image data belongs to a color document page or a monochrome document page. A frequency distribution represents the frequency of each value of pixel data constituting a read document page. A monochrome pixel can be regarded as including R, G, and B components whose values are almost equal to each other. It is therefore possible to determine whether a read document page is a color or monochrome document page by analyzing whether the frequency distributions of the color components constituting each pixel of the read image data have the same tendency or different tendencies. Assume that read pixel data is constituted by red (R), green (G), and blue (B) components. In this case, if the frequency distributions of the R, G, and B components exhibit the same tendency in terms of peak value or frequency, that is, if the histograms of the respective color components match each other, it is possible to determine that the read document page is a monochrome document page. In this case, however, the overall frequency distribution of one read document page includes too large frequencies to perform accurate determination. For this reason, the apparatus segments the image data of the read document page into a plurality of regions and generates a frequency distribution for each segmented region. The apparatus then analyzes each generated frequency distribution to improve the determination accuracy. Note that in this case, segmenting the image data into regions having the same size will equalize the total numbers of frequencies of the respective frequency distributions, thereby further improving the determination accuracy.

In addition, a frequency distribution is sometimes used to analyze the presence/absence of a content in read image data. That is, a frequency distribution is used to determine whether a read document page is a blank page or a page containing a content such as characters and thin lines. If the variance value obtained from this frequency distribution is smaller than a threshold, the apparatus determines that the read document page is a blank page.

In this case as well, it is preferable to segment a read document page into a plurality of regions and generate a frequency distribution for each segmented region instead of generating a frequency distribution for one overall read document page. In addition, equalizing the total numbers of frequencies of the frequency distributions of the respective segmented regions can improve the accuracy of information statistically obtained for an analysis on each frequency distribution.

FIG. 8A shows a case in which the remaining number of lines at the time of the detection of the trailing end of a document page by the trailing end detection sensor 107 exceeds two times the reference region width 1043. In this case, therefore, for example, it is possible to generate a frequency distribution of the black rectangular region next to the white rectangular region to which the line 801 belongs. The region control unit 109 therefore performs control to generate a second region frequency distribution by using the image data belonging to the next black rectangular region along with the progression of document reading operation. In addition, the frequency distribution generation unit 110 generates the second region frequency distribution 1104 in accordance with region control by the region control unit 109. Upon generating a frequency distribution for a second region after the detection of the trailing end of a document page, the region control unit 109 handles subsequently input image data as a region including the influence of the shadow of the trailing end, and does not control the frequency distribution generation unit 110 to generate a frequency distribution. The distance between the trailing end detection sensor 107 and the reading device 106 is fixed and can be converted into the number of lines in accordance with the resolution in the sub-scanning direction. In addition, the reference region width 1043 is provided before document reading operation. It is therefore possible to determine whether the remaining number of lines at the time of the detection of the trailing end of a document page by the trailing end detection sensor 107 exceeds two times the reference region width 1043 at the time of the detection of the trailing end of the document page by the trailing end detection sensor 107.

If, however, the amount of image data read after the detection of the trailing end of the read image data by the trailing end detection sensor 107 greatly exceeds two time the reference region width 1043, for example, becomes four times the reference region width 1043, the region control unit 109 performs different control. That is, upon generating a frequency distribution of the subsequent black rectangular region, if there is a data amount including a pair of next white and black rectangular regions, the region control unit 109 performs control to generate frequency distributions based on equal sample counts in the two regions in the sub-scanning direction.

Figure 8B:
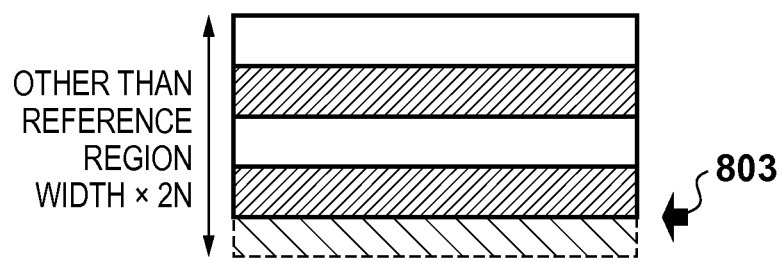

FIG. 8B shows the regions of the document image data 603 reflected in the first region frequency distribution 1103 and the second region frequency distribution 1104 in such control operation. Referring to FIG. 8B, the position denoted by reference numeral 803 is the boundary between regions at which the sample count of the first region frequency distribution 1103 is equal to that of the second region frequency distribution 1104. That is, the data acquired from the gray hatched region after the position 803 is not reflected in the first region frequency distribution 1103 and the second region frequency distribution 1104. Note that the above trailing end control for read image data by the region control unit 109 is based on the set value of the trailing end effective position 1042 set by the CPU 101 or the set value of the number of pixels read from document image data (not shown) in the sub-scanning direction. That is, this control is based on the assumption that the CPU 101 recognizes the timing of the detection of a trailing end by the trailing end detection sensor 107 and sets the number of pixels read up to the trailing end effective position or trailing end of the read image data based on information at the time of reading operation such as a reading resolution. Control by the CPU 101 and control by the region control unit 109 will be described later with reference with other drawings.

The following is a case in which the number of pixels of read image data in the sub-scanning direction from which the region of the shadow of the leading end included in the read image data is 2N times (N is an integer equal to or more than 1) the set value of the reference region width 1043. FIG. 9A is a view showing a concept of this case. FIG. 9A shows a state in which the remaining region of the read image data at the timing of the trailing end of the document image by the detection of the trailing end detection sensor 107 exceeds two times the set value of the reference region width 1043. As described with reference to FIGS. 8A and 8B, the remaining region of the read image data indicates the amount of image data belonging to the interval from the trailing end detection sensor 107 to the reading position 604. Assume also that in FIG. 9A, each white rectangular region indicates a region the data acquired from which is reflected in the first region frequency distribution 1103, and each black rectangular region indicates a region the data acquired from which is reflected in the second region frequency distribution 1104. Assume that the apparatus starts region switching from a white rectangular region as in the case described with reference to FIGS. 8A and 8B. That is, the following description is based on the assumption that the apparatus subsequently alternately switches black and white rectangular regions in the order named.

Referring to FIG. 9A, reference numeral 901 denotes the timing when the trailing end detection sensor 107 has detected the trailing end of the read image data. In this embodiment, since the amount of image data belonging to the interval from the trailing end detection sensor 107 to the reading position 604 is equal to or more than two times the set value of the reference region width 1043, the apparatus subsequently reads image data corresponding to the portion denoted by reference numeral 902.

At the timing (the position denoted by reference numeral 901) when the trailing end detection sensor 107 has detected the trailing end of the read document page, a black rectangular region generates a frequency distribution. That is, this is the timing when the generated frequency distribution is reflected as the frequency distribution of the read image data in the second region frequency distribution 1104. In this embodiment, the amount of image data belonging to the interval from the trailing end detection sensor 107 to the reading position 604 is equal to or more than two times the set value of the reference region width 1043. In addition, the embodiment is based on the assumption that the number of pixels in the sub-scanning direction from which the influence of the shadow of the leading end portion of the read image data is removed is 2N times the reference region width 1043. Therefore, even after the timing when the trailing end detection sensor 107 has detected the trailing end of a read document page, the apparatus inputs read image data at least two times the reference region width 1043. After the generation of the current second region frequency distribution, the sample count of the frequency distribution 1103 acquired from the first region becomes the same as that of the frequency distribution 1104 acquired from the second region. Even if subsequently input white and black rectangular regions are respectively reflected in the first region frequency distribution 1103 and the second region frequency distribution, it is possible to equalize the sample counts. In this case, however, the lower portion denoted by reference numeral 902 corresponds to the image trailing end of the document image data 603. As has been described, this trailing end portion includes a shadow portion in read image data. Therefore, this portion should not be reflected in the first region frequency distribution 1103 and the second region frequency distribution 1104. For this reason, the region control unit 109 performs control to reflect, in the generation of each frequency distribution, data acquired in the interval from the time point (reference numeral 901) as a reference when the trailing end detection sensor 107 has detected the document trailing end to the earliest timing when the sample count of the frequency distribution 1103 acquired from the first region becomes equal to the sample count of the frequency distribution 1104 acquired from the second region. FIG. 9B shows the regions of the document image data 603 which are respectively reflected in the first region frequency distribution 1103 and the second region frequency distribution 1104 when such control is performed. Referring to FIG. 9B, the position denoted by reference numeral 903 is between regions at which the sample count of the first region frequency distribution 1103 is equal to that of the second region frequency distribution 1104 without any influence of the shadow of the trailing end of the document image data. That is, the data acquired from the gray hatched regions after the position 903 are not reflected in the first region frequency distribution 1103 and the second region frequency distribution 1104. Note that the above trailing end control for read image data by the region control unit 109 is based on the set value of the trailing end effective position 1042 set by the CPU 101 or the set value of the number of pixels read in the sub-scanning direction of document image data (not shown) as in the case described with reference to FIGS. 8A and 8B. That is, this control is based on the assumption that the CPU 101 recognizes the timing of the detection of a trailing end by the trailing end detection sensor 107 and sets the trailing end effective position of read image data or the set value of the number of read pixels in the sub-scanning direction of document image data based on information at the time of reading operation such as a reading resolution.

FIGS. 8A, 8B, 9A, and 9B show a case in which the predetermined number of groups of reference regions is set to two. The following is a more general description of this case. That is, the apparatus further divides the remaining number of lines of the effective region at the time of the detection of the trailing end of the document page by the trailing end detection sensor 107 by the number of lines corresponding to the reference region width. This converts the number of lines into the number of reference regions (which is represented by J). In this case, the number of groups of reference regions as frequency distribution totalization targets is represented by K (K=2 in the above case), and the region in which totalization is currently performed is the ith region (i=0 to K−1). Note however that the first reference region of the effective region is the 0th region. The apparatus then obtains (J+i)/K (the remainder will be rounded off). When reference regions are classified into K groups respectively assigned with numbers from 0 to K−1, the value of (J+i)/K represents the number of sets of reference regions, with K regions being one set, included in the unread portion of the effective region at the time of the detection of the trailing end of the document page. Note that the number of sets of reference regions includes a set being read. In this case, the apparatus cyclically and sequentially reads sets of reference regions, which are respectively assigned with the numbers 0 to K−1, and hence can easily determine how a given reference region in the course of reading ranks in terms of the assigned numbers. Therefore, upon detecting the trailing end of a document page, the apparatus therefore totalizes frequency distributions for each group until it reads (J+i)/K reference regions of the last group (that is, the (K−1)th group), and sets the subsequent regions other than totalization targets. In other words, the apparatus sets, as frequency distribution totalization targets, the remaining K×((J+i)/K)−i (operation "/" represents an integer quotient) reference regions excluding the currently read reference region, and sets the subsequent regions other than targets. This is because the remaining regions do not include one set of reference region, that is, M reference regions, and setting them as totalization targets will lead to variation in the sample counts of the respective reference regions. In this case, J is decided from the distance from the trailing end detection sensor 107 to the reading device 106 and the reference region width, and the number of groups, that is, the number K of reference regions constituting one set, is decided in advance. Note that (J+i)/K=0 indicates that when the trailing end of a document page is detected, the unread portion does not include one set of reference regions, that is, K reference regions. Since it is difficult to undo a total value by a predetermined step after totalization, it is necessary to decide a reference region width and the reference region count K corresponding to one set in advance so as to satisfy (J+i)/K>0. For this purpose, J and K are decided in advance so as satisfy (J+i)/K>0 (since "/" represents an integer quotient, (J+i)/K≥1, that is, J≥K) even in a case in which the value of i is 0, which is the minimum value. Since the value of J is decided from the distance from the trailing end detection sensor 107 to the reading device 106 and a reference region width, a reference region width and the number K of reference regions constituting one set are decided to satisfy J≥K.

The purpose of this operation is to decide the size of a document page in the conveying direction and the size of the effective region in the conveying direction at the time of the detection of the trailing end detection sensor by the trailing end of the document page. The purpose of the above procedure is to sample the effective region for each group so as to equalize the numbers of reference regions of the respective groups and totalize the frequency distributions of pixel values.

As described above, even if a document size is not determined at the start of reading operation by region control by the region control unit 109 based on the reference region width 1043 and frequency distribution generation by the frequency distribution generation unit 110, it is possible to generate frequency distributions with an equal number of frequencies for each reference region width 1043. FIGS. 10A and 10B show the arrangement concept of the first region frequency distribution 1103 and second region frequency distribution 1104 in this case. FIG. 10A is a graph showing the state of the first region frequency distribution 1103. FIG. 10B is a graph showing the state of the second region frequency distribution 1104. Although frequency distributions in FIGS. 10A and 10B differ in shape, the sample counts of the respective regions are equal. That is, it is possible to generate frequency distributions based on an equal sample count without any influence of shadows.

<Frequency Distribution Generation Procedure>

Control by the CPU 101, the region control unit 109, and the frequency distribution generation unit 110 will be described by using other drawings. FIG. 11 shows the overall operation procedure in the frequency distribution generation unit. In the operation procedure in the frequency distribution generation unit in this embodiment, the region control unit 109 performs region control on the image data read by the reading device 106 so as to equalize the sample counts in the respective reference regions in the sub-scanning direction (step S101). The frequency distribution generation unit 110 generates frequency distributions in accordance with the control signal 203 and image data 204 output from the region control unit 109 (step S102).

Figure 12:
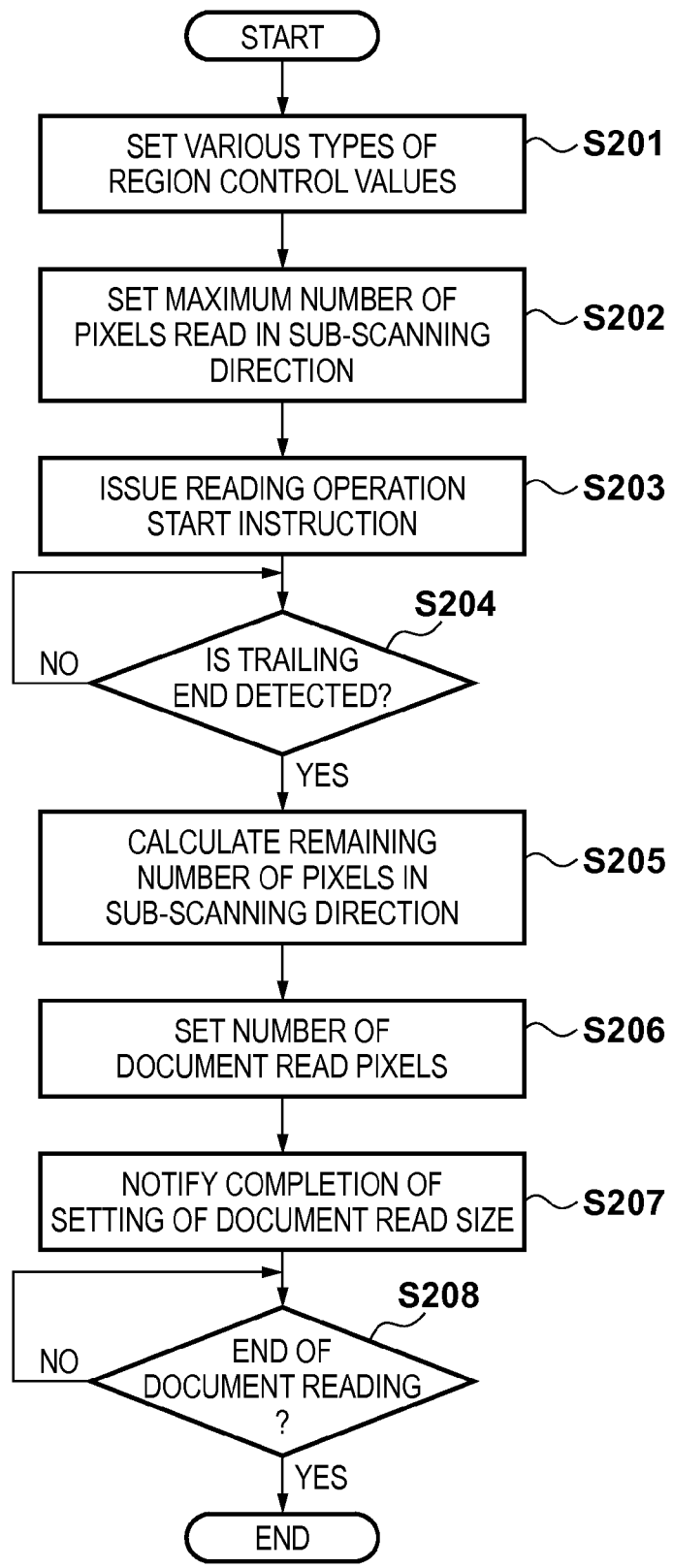
FIG. 12 is a flowchart showing a control procedure for a CPU 101 in the first embodiment.

FIG. 12 is a flowchart showing a control procedure in the CPU 101 which controls the overall frequency distribution generation unit in this embodiment. At the startup of the apparatus in the embodiment, the CPU 101 performs setting necessary for region control by the frequency distribution generation unit, that is, the leading end effective position 1041, the trailing end effective position 1042, and the reference region width 1043 (step S201). Note that since a document size is not determined at the start of document image data reading when the ADF 105 performs reading operation, the CPU 101 sets the trailing end effective position 1042 to the maximum set value which can be set in step S201. The CPU 101 then sets the number of pixels read in the sub-scanning direction of the document image data (step S202). Note that like setting of the trailing end effective position 1042 in step S201, the CPU 101 sets the number of pixels read in the sub-scanning direction to the maximum set value which can be set in step S202 because the document size is not determined at the start of reading operation.

Upon completing the above setting, the CPU 101 issues a reading operation start instruction (step S203). The CPU 101 does not change the set values set in steps S201 and S202 until the trailing end detection sensor 107 detects a trailing end during reading operation for the document image data 603 (NO in step S204). Upon receiving a trailing end detection signal concerning the document image data 603 from the trailing end detection sensor 107 (YES in step S204), the CPU 101 calculates the remaining number of pixels in the sub-scanning direction in accordance with the mechanical arrangement of the image processing apparatus and parameters at the time of operation such as the reading resolution of the document image data 603 (step S205). More specifically, the CPU 101 determines the number of pixels read from the region from the position of the trailing end detection sensor 107 to the reading position 604 in the sub-scanning direction, as a document image size, based on parameters such as a resolution at the time of document reading operation.

Upon completing the calculation of the remaining number of pixels read in the sub-scanning direction in step S205, the CPU 101 sets the trailing end effective position 1042 of the document image data and the number of pixels read in the sub-scanning direction upon determination of the document size (step S206). That is, the CPU 101 sets a value for the setting target, for which the maximum value which can be set is set in step S201, in accordance with the determination of the document size. In addition, the CPU 101 notifies the region control unit 109 of the completion of setting to indicate the completion of setting of the number of pixels read in the sub-scanning direction upon determination of the document size (step S207). The CPU 101 then waits for a reading completion notification concerning the document image data 603. Upon receiving the reading completion notification, the CPU 101 terminates the control procedure (step S208).

Figure 13:
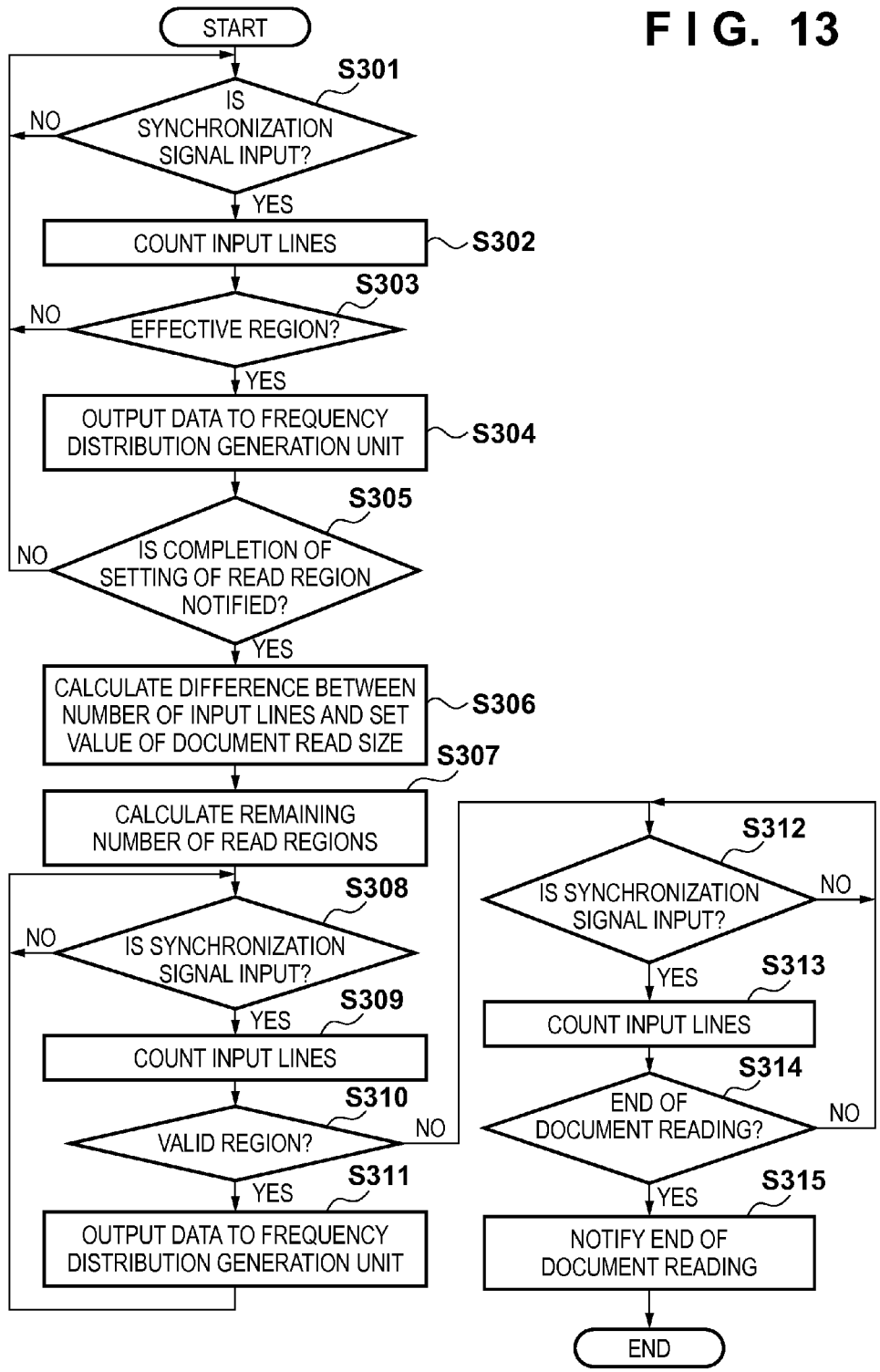
FIG. 13 is a flowchart showing a control procedure for a region control unit 109 in the first embodiment.

An operation procedure in the region control unit 109 under the control of the CPU 101 shown in FIG. 12 will be described next. FIG. 13 is a flowchart showing a control procedure in the region control unit 109. When the region control unit 109 issues a reading operation start instruction for document image data under the control of the CPU 101 in step S203, the reading device 106 starts reading the document image data 603. The reading I/F control unit 108 converts the image data read by the reading device 106 into digital data and outputs it to the region control unit 109. At this time, the reading I/F control unit 108 outputs the digitally converted image data, together with the synchronization signal 202. The region control unit 109 does not start region control until receiving the synchronization signal 202 from the reading I/F control unit 108 (NO in step S301). Upon receiving the synchronization signal 202 from the reading I/F control unit 108 (YES in step S301), the line counter 1091 counts the number of input lines (step S302). If the count value obtained in step S302 has not reached the set value of the leading end effective position 1041 set by the CPU 101 in step S201, the line counter 1091 waits for an input of read image data again (NO in step S303). The control performed by the region control unit 109 in step S303 can eliminate the influence of the shadow included in the leading end read image data of the document image data. If the input line count value obtained in step S302 has reached the set value of the leading end effective position 1041, the region control unit 109 shifts to the next control (YES in step S303).

That is, the output control unit 1095 outputs the one-line read image data input following the synchronization signal 202 as the image data 204 to the frequency distribution generation unit 110 (step S304). The output control unit 1095 also outputs the region identification signal 203, together with the image data 204, to the frequency distribution generation unit 110. The region control unit 109 repeatedly executes the processing from step S301 to step S304 until it receives the notification of the completion of setting of a document reading size issued by the CPU 101 in step S207 (NO in step S305). Upon receiving the notification of the completion of setting of a document reading size from the CPU 101 (YES in step S305), the region control unit 109 calculates the difference between the value counted in step S302 and the set value of the document reading size (step S306). The difference calculated in step S306 indicates the number of pixels of the read image data of the subsequently input document image data 603 in the sub-scanning direction. That is, the CPU 101 obtains the number of pixels in the sub-scanning direction (that is, the number of lines) from the position of the trailing end detection sensor 107 to the reading position 604. Since this value is obtained in accordance with the distance between the trailing end detection sensor and the reading device, which are structurally fixed, and the pixel density in the sub-scanning direction, the CPU 101 obtains the value by using the pixel density in the sub-scanning direction as a parameter in practice. A pixel density is generally selected from choices such as 200 dpi, 300 dpi, 400 dpi, 600 dpi, and 1,200 dpi. The region control unit 109 calculates the remaining number of read regions by using the calculation result obtained in step S306 and the set value of the reference region width 1043 set by the CPU 101 in step S201 (step S307). In this case, the region control unit 109 performs subsequent control based on cases in which the number of pixels in the sub-scanning direction from which the number of pixels corresponding to the leading end shadow portion of the document image data 603 is deleted is not 2N times the reference region width 1043 and is 2N times the reference region width 1043. Note that control to be performed when the number of pixels is not 2N times the reference region width 1043 or is 2N times the reference region width 1043 has already been described with reference to FIGS. 8A and 8B or FIGS. 9A and 9B, a description of the control will be omitted. If the number of groups of reference regions is K, the CPU 101 decides a reference region as a frequency distribution totalization target according to the general rule described after the description of FIGS. 8A and 8B or FIGS. 9A and 9B.

The region control unit 109 stands by until the next synchronization signal 202 is input (NO in step S308). Upon receiving the synchronization signal 202 (YES in step S308), the region control unit 109 counts input lines (step S309). If the count value obtained in step S309 indicates a region to be output to the frequency distribution generation unit 110 on the subsequent stage, the region control unit 109 outputs the region identification signal 203 and the image data 204 to the frequency distribution generation unit 110 (YES in step S310). That is, if regions should be reflected in the first region frequency distribution 1103 and the second region frequency distribution 1104, the region control unit 109 outputs the data to the frequency distribution generation unit 110 (step S311). The region control unit 109 switches regions in accordance with the region identification signal 203 in response to a signal indicating that the count value has reached the reference region width output from the comparison unit 1094 as a trigger. The region control unit 109 may sequentially switch reference regions from the first region to the next (i←i+1 (where i≤K))th region if K reference regions constitute one set. If the input read image data falls outside a frequency distribution totalization target region, the region control unit 109 outputs no data to the frequency distribution generation unit 110 (NO in step S310). That is, the region control unit 109 performs control to output no data to the frequency distribution generation unit 110 if the count value belongs to a region in which the sample count of the first region frequency distribution 1103 is not equal to that of the second region frequency distribution 1104.

That is, the region control unit 109 performs control so as not to use, for frequency distribution generation, any read image data input after a region determined not as a target region. More specifically, upon receiving the synchronization signal 202 input after a region determined not as a target region is input (step S312), the region control unit 109 counts the number of input lines by using the line counter 1091 (step S313). The region control unit 109 continuously performs the processing from step S312 to step S313 until the count value as the number of input lines in step S313 has reached the set value of the number of pixels in the sub-scanning direction of document image data which is set by the CPU 101 (NO in step S314). When the input line count value obtained in step S313 reaches the number of pixels read in the sub-scanning direction of the document image data (YES in step S314), the region control unit 109 outputs an end notification indicating the end of reading of the document image data 603 to the CPU 101.

An operation procedure in the frequency distribution generation unit 110 under the control of the region control unit 109 shown in FIG. 13 will be described next. FIG. 14 is a flowchart showing a control procedure in the frequency distribution generation unit 110. The frequency distribution generation unit 110 performs no control until it receives the region identification signal 203 and the image data 204 from the region control unit 109 (NO in step S401). When the region control unit 109 outputs the region identification signal 203 and the image data 204 (YES in step S401), the data sorting unit 1102 switches frequency distributions, in which the value of the input image data 204 is to be reflected, in accordance with the value represented by the region identification signal 203 (step S402). That is, if the region identification signal 203 from the region control unit 109 indicates reflection in the first region frequency distribution (YES in step S402), the data sorting unit 1102 performs control to reflect the value of the image data 204 in the first region frequency distribution 1103 (step S403). If the region identification signal 203 indicates reflection in the second region frequency distribution (NO in step S402), the data sorting unit 1102 performs control to reflect the value of the image data 204 in the second region frequency distribution 1104 (step S404). Since the region control unit 109 performs control to equalize the sample counts of the first and second region frequency distributions 1103 and 1104, the data sorting unit 1102 performs control to switch frequency distribution generation targets in accordance with the region identification signal 203 output from the region control unit 109. The frequency distribution generation unit 110 continuously performs the processing from step S401 to step S403 or from step S401 to step S404 (step S405) until the region control unit 109 notifies the end of document reading (step S313).

Referring to FIG. 14, reference regions are classified into two types of regions, namely the first and second regions, that is, two groups of regions, and two groups constitute one set. Even if one set includes three or more groups, frequency distributions are totalized for each region determined in step S402 as in the case shown in FIG. 14.

Although the first embodiment has been described on the assumption that the region control unit 109 is directly connected to the frequency distribution generation unit 110, this embodiment is not limited to this. For example, the apparatus may be configured to include a module for executing image processing for the image data 204 on the subsequent stage of the region control unit 109 and input an image processing result to the frequency distribution generation unit 110. In this case, the region identification signal 203 output from the region control unit 109 may be input to the frequency distribution generation unit 110 via the image processing module.

As described above, in the first embodiment, when a document size is not determined at the start of reading operation and the remaining read image data at the time of the detection of the trailing end of the document page is equal to or more than 2N times the reference region width 1043, it is possible to equalize the frequency distribution sample counts of a plurality of regions in the sub-scanning direction. In addition, this embodiment has exemplified the frequency distribution generation arrangement which sets the set value of the reference region width 1043 in frequency distribution generation in accordance with a detection target in frequency distribution generation, thereby improving the accuracy of subsequent frequency distribution analysis.

[Second Embodiment]

The first embodiment has exemplified control on the region control unit 109 and the frequency distribution generation unit 110 when the read image data region after the detection of the trailing end of a document image by the trailing end detection sensor 107 exceeds two times (K times in general; the same will apply hereinafter) the set value of the reference region width 1043. In the arrangement of the image processing apparatus, however, the number of pixels (the number of lines) in the sub-scanning direction from the installation position of the trailing end detection sensor 107 to the reading position 604 is sometimes less than two times the reference region width 1043. According to the above description, the first embodiment is configured to set a reference region width and the number K of reference regions constituting one set so as to avoid such a case. However, the value of the reference region width 1043 is set in accordance with a detection target in frequency distribution generation, and hence it is required to cope with this setting. In addition, even if the arrangement of the image processing apparatus remains the same, when the value of the reference region width 1043 is set to a value larger than that described in the first embodiment, a read image data region after the detection of the trailing end of a document page can be a value roughly corresponding to one reference region width 1043. The second embodiment will exemplify a case in which a read image data region after the detection of the trailing end of the document page by the trailing end detection sensor 107 is very near/less than the set value of the reference region width 1043.

The internal arrangement of a region control unit 109 in this embodiment is the same as that in the first embodiment. The internal arrangement of a frequency distribution generation unit 110 in the second embodiment differs from that in the first embodiment. FIG. 15 shows the arrangement of the frequency distribution generation unit 110 in a case in which the second embodiment is implemented. The same reference numerals as in FIG. 15 denote the same components of the frequency distribution generation unit 110 in the first embodiment.

The constituent elements of the frequency distribution generation unit 110 in this embodiment will be described in detail. Referring to FIG. 15, a first region preceding-stage frequency distribution 1501 is configured to reflect the value of image data 204 in a frequency distribution when the value of a region identification signal 203 output from a data sorting unit 1102 indicates frequency distribution generation for a first region. A second region preceding-stage frequency distribution 1502 is configured to reflect the value of the image data 204 in a frequency distribution when the value of the region identification signal 203 output from the data sorting unit 1102 indicates frequency distribution generation for a second region. The first region preceding-stage frequency distribution 1501 is connected to a first region frequency distribution 1103. The second region preceding-stage frequency distribution 1502 is connected to a second region frequency distribution 1104. A frequency distribution reflection signal 1503 is a signal output from the data sorting unit 1102 at the timing when the value represented by the region identification signal 203 input from the region control unit 109 changes by two regions. More specifically, this signal is a control signal which changes at the timing when a value indicating a first region switches to a value indicating a second region and then switches to a value indicating a first region. That is, the signal is an output signal which becomes significant information at the timing when the value switches to the value indicating a first region in the second and subsequent steps. In more general, when the apparatus obtains frequency statistics for each reference region with K reference regions constituting one set, the data sorting unit 1102 outputs the frequency distribution reflection signal 1503 at the timing when the region identification signal 203 switches from the Kth reference region to the first reference region. The first region frequency distribution 1103 and the second region frequency distribution 1104 respectively allow the values of the preceding-stage frequency distributions connected to the preceding stages to be reflected in them at the output timing of the frequency distribution reflection signal 1503. That is, when the frequency distribution reflection signal 1503 is output, the first region frequency distribution 1103 cumulatively adds the value of the first region preceding-stage frequency distribution 1501 to the value of the frequency distribution held so far. As a result, the total of past frequency distributions is reflected in the first region frequency distribution 1103. Likewise, when the frequency distribution reflection signal 1503 is output, the second region frequency distribution 1104 cumulatively adds the value of the second region preceding-stage frequency distribution 1502 to the value of the frequency distribution held so far. As a result, the total of past frequency distributions is reflected in the second region frequency distribution 1104. That is, each preceding stage frequency distribution is provided to temporarily store frequency distributions corresponding to one set of reference regions. When the totalization of frequency distributions corresponding to one set of reference regions is complete, the resultant data is collectively reflected in the frequency distribution.

The reason why the frequency distribution generation unit 110 has this arrangement will be described by using other drawings. Described first is a case in which the number of pixels of read image data in the sub-scanning direction from which the number of pixels corresponding to the leading end shadow portion included in the read image data is removed is not 2N times (N is an integer equal to or more than 1) the set value of a reference region width 1043. FIGS. 16A and 16B show a state in which a read image data region after the detection of the trailing end of the document image by a trailing end detection sensor 107 is less than the set value of the reference region width 1043. As described in the first embodiment, the remaining region of the read image data indicates the amount of image data belonging to the interval from the position of the trailing end detection sensor 107 to a reading position 604. Assume also that in FIGS. 16A and 16B, each white rectangular region indicates a region the data from which is reflected in the first region frequency distribution 1103, and each black rectangular region indicates a region the data acquired from which is reflected in the second region frequency distribution 1104. Assume that the apparatus starts region switching from a white rectangular region. That is, the following description is based on the assumption that the apparatus subsequently alternately switches black and white rectangular regions in the order named.

Referring to FIG. 16A, reference numeral 1601 denotes the timing when the trailing end detection sensor 107 has detected the trailing end of the read image data. In this description, since the amount of image data belonging to the interval from the position of the trailing end detection sensor 107 to the reading position 604 is less than the set value of the reference region width 1043, the image data region denoted by reference numeral 1602 is less than a value corresponding to one region of the set value of the reference region width 1043.

At the timing (the position denoted by reference numeral 1601) when the trailing end detection sensor 107 has detected the trailing end of the read document page, the data acquired from the white rectangular region generates a frequency distribution. That is, this is the timing when the generated frequency distribution is reflected as the frequency distribution of the read image data in the first region preceding-stage frequency distribution 1501. In order to generate frequency distributions with the same sample count in two regions in the sub-scanning direction, it is necessary to generate the second region preceding-stage frequency distribution 1502 by using image data belonging to the next black rectangular region. Referring to FIG. 16A, however, since the amount of read image data after the detection of the trailing end of the read image data by the trailing end detection sensor 107 is less than the reference region width 1043, there is insufficient image data to generate the frequency distribution of the next black rectangular region. If, therefore, the first region preceding-stage frequency distribution 1501 generated at the timing (denoted by reference numeral 1601) of the detection of the trailing end of the document page by the trailing end detection sensor 107 is reflected in the first region frequency distribution 1103, the sample count of the first region frequency distribution becomes different from that of the second region frequency distribution. In order to prevent this, therefore, the internal arrangement of the frequency distribution generation unit 110 includes the first region preceding-stage frequency distribution 1501 and the second region preceding-stage frequency distribution 1502. That is, in the case shown in FIG. 16A, the apparatus generates frequency distributions for the first region preceding-stage frequency distribution 1501 and the second region preceding-stage frequency distribution 1502 after the timing (reference numeral 1601) of the detection of the trailing end of the document page by the trailing end detection sensor 107. However, since the width of the last black rectangular region is less than the reference region width 1043, there is no timing of switching to the next white rectangular region. That is, the apparatus does not output the control signal 1503. As a consequence, the first region frequency distribution 1103 and the second region frequency distribution 1104 at the time of the completion of reading of document image data 603 become those from which the last white rectangular region and the last black rectangular region are removed. FIG. 16B shows the arrangement of input image data and the arrangement of image data reflected in the first region frequency distribution 1103 and the second region frequency distribution 1104. Referring to FIG. 16B, reference numeral 1603 denotes the boundary position of reflection in the first region frequency distribution 1103 and the second region frequency distribution 1104.

Described next is a case in which the number of pixels of read image data in the sub-scanning direction from which the number of pixels corresponding to the leading end shadow portion included in the read image data is removed is 2N times (N is an integer equal to or more than 1) the set value of a reference region width 1043.

Figure 17A:
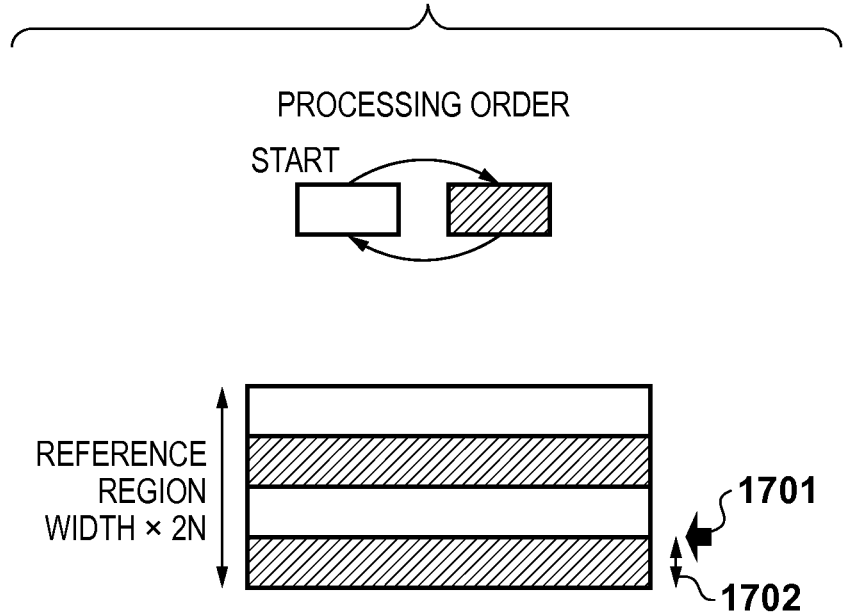
FIGS. 17A and 17B are views showing a frequency distribution generation target region (the region width 2N) in the second embodiment.
Figure 17B:
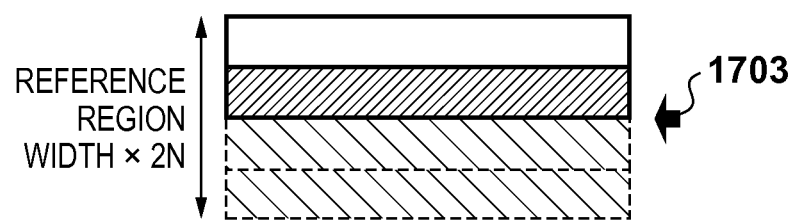

FIGS. 17A and 17B show a state in which a read image data region after the detection of the trailing end of a document image by the trailing end detection sensor 107 is less than the set value of the reference region width 1043. Referring to FIGS. 17A and 17B, as in the case shown in FIGS. 16A and 16B, each white rectangular region indicates a region reflected in the first region frequency distribution 1103, and each black rectangular region indicates a region reflected in the second region frequency distribution 1104. Assume that the apparatus starts region switching from a white rectangular region.

Referring to FIG. 17A, reference numeral 1701 denotes the timing when the trailing end detection sensor 107 has detected the trailing end of the read image data. In this embodiment, the amount of image data belonging to the interval from the position of the trailing end detection sensor 107 to the reading position 604 is less than the set value of the reference region width 1043. Therefore, the image data region denoted by reference numeral 1702 is less than a value corresponding to one region of the set value of the reference region width 1043.

At the timing (the position denoted by reference numeral 1701) when the trailing end detection sensor 107 has detected the trailing end of the read document page, the data acquired from the black rectangular region generates a frequency distribution. That is, this is the timing when the generated frequency distribution is reflected as the frequency distribution of the read image data in the second region preceding-stage frequency distribution 1502. Referring to FIG. 17A, the amount of read image data after the detection of the trailing end of the read image data by the trailing end detection sensor 107 is less than the reference region width 1043.

The arrangement shown in FIGS. 17A and 17B differs from that shown in FIGS. 16A and 16B.

That is, reflecting all input image data in frequency distribution generation can make the sample count of the frequency distribution generated by the data acquired in a white rectangular region equal to the sample count of the frequency distribution generated by the data acquired in a black rectangular region. The image data of the last black rectangular region in FIG. 17A includes the influence of the shadow of the trailing end of the document page. When, however, performing an analysis by using a generated frequency distribution, shadow image data makes it impossible to perform accurate determination.

In order to prevent this, the internal arrangement of the frequency distribution generation unit 110 includes the first region preceding-stage frequency distribution 1501 and the second region preceding-stage frequency distribution 1502. That is, in the case shown in FIG. 17A, after the timing (reference numeral 1701) of the detection of the trailing end of the document page by the trailing end detection sensor 107, the apparatus generates frequency distributions for the first region preceding-stage frequency distribution 1501 and the second region preceding-stage frequency distribution 1502. After the input of the image data of the last black rectangular region, there is no image data of a white rectangular region. That is, the apparatus does not output the control signal 1503. This removes the frequency distributions of the last white and black rectangular regions from the first region frequency distribution 1103 and the second region frequency distribution 1104 at the time of the completion of reading of the document image data 603. FIG. 17B shows the arrangement of the input image data and the arrangement of image data reflected in the first region frequency distribution 1103 and the second region frequency distribution 1104. Referring to FIG. 17B, reference numeral 1703 denotes the boundary position of reflection in the first region frequency distribution 1103 and the second region frequency distribution 1104.

A control procedure in the frequency distribution generation unit 110 in the second embodiment will be described next. Since a control procedure in the CPU 101 and a control procedure in the region control unit 109 in the second embodiment are the same as those in the first embodiment, a description of the procedures will be omitted.

Figure 18:
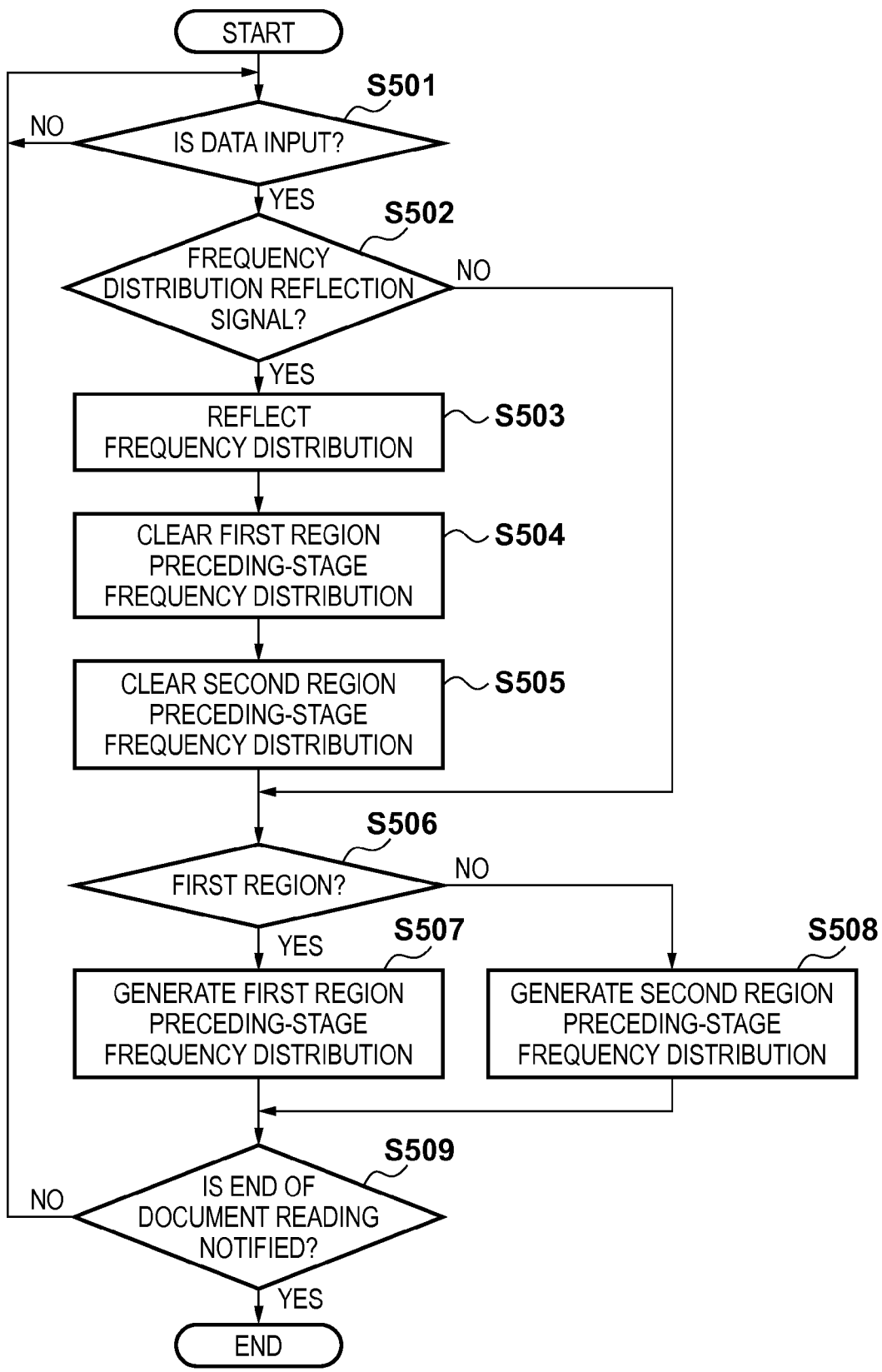
FIG. 18 is a flowchart showing a control procedure for the frequency distribution generation unit 110 in the second embodiment.

FIG. 18 is a flowchart showing a control procedure in the frequency distribution generation unit 110 in the second embodiment. The frequency distribution generation unit 110 does not perform control until it receives the region identification signal 203 and the image data 204 from the region control unit 109 (NO in step S501). When the region control unit 109 outputs the region identification signal 203 and the image data 204 (YES in step S501), the frequency distribution generation unit 110 causes the data sorting unit 1102 to recognize that the input image data is the image data for the first region and switch frequency distributions in which the value of the input image data 204 is to be reflected, in accordance with the value represented by the region identification signal 203, without outputting the control signal 1503 (step S506). If the region identification signal 203 from the region control unit 109 indicates reflection in the frequency distribution of the first region (YES in step S506), the data sorting unit 1102 reflects the value of the image data 204 in the first region preceding-stage frequency distribution 1501 (step S507). If the region identification signal 203 indicates reflection in the frequency distribution of the second region (NO in step S506), the data sorting unit 1102 reflects the value of the image data 204 in the second region preceding-stage frequency distribution 1502 (step S508). The frequency distribution generation unit 110 checks whether it has received a document reading end notification from the region control unit 109, and waits for the next input data (step S501) if it has received no document reading end notification (NO in step S509). Upon receiving data from the region control unit 109, the data sorting unit 1102 outputs the control signal 1503 if the input image data is switched to image data of the first region for the second or subsequent time. When the data sorting unit 1102 outputs the control signal 1503, the first region frequency distribution 1103 reflects the frequency distribution held in the first region preceding-stage frequency distribution 1501 connected to the preceding stage in the value which has been held in the first region frequency distribution 1103. At the same timing, the second region frequency distribution 1104 reflects the frequency distribution, held in the second region preceding-stage frequency distribution 1502 connected to the preceding stage, in the value which has been held in the second region frequency distribution 1104 (step S503). In response to reflection in the first region frequency distribution 1103, the first region preceding-stage frequency distribution 1501 initializes the held frequency distribution to prepare for frequency distribution generation indicated by the next image data 204 (step S504). In response to reflection in the second region frequency distribution 1104, the second region preceding-stage frequency distribution 1502 initializes the held frequency distribution to prepare for frequency distribution generation indicated by the next image data 204 (step S505). Upon completion of reflection in the first region frequency distribution 1103 and the second region frequency distribution 1104, the data sorting unit 1102 performs the processing from step S506 to step S508 described above based on the region identification signal 203 and image data 204 input from the region control unit 109. The frequency distribution generation unit 110 repeatedly executes the processing from step S501 to step S508 until it receives a document reading end notification from the region control unit 109 (NO in step S509), and terminates the processing in accordance with the notification (YES in step S509).

As described above, in this embodiment, upon completion of the totalization of frequency distributions of one set of reference regions, the apparatus reflects the resultant data in the totalization of frequency distributions of the overall image. For this reason, any data concerning a set of reference regions in which totalization has not been complete is not reflected in the frequency distribution of the overall image.

As described above, according to the second embodiment, even if a read image data region after the detection of the trailing end of a document page is very near/less than the reference region width 1043, it is possible to generate frequency distributions whose sample counts in the sub-scanning direction are equal.

[Third Embodiment]

The first and second embodiments have exemplified the case in which the influence of the shadow of the trailing end of a document image is eliminated and the frequency distribution sample counts of a plurality of regions in the sub-scanning direction are equalized in accordance with the relationship between a read image data region after the detection of the trailing end of the document image and the set value of the reference region width 1043. Assume, however, that the set value of the reference region width 1043 is large. In this case, if the apparatus performs control so as not to acquire the frequency distribution of a read image data region less than the reference region width 1043 to equalize the frequency distribution sample counts, a larger region is not reflected in frequency distributions relative to the document image data. The larger a region which is not reflected in frequency distributions, the higher the possibility of interfering with an analysis using frequency distributions. The third embodiment is configured to solve this problem.

Figure 19:
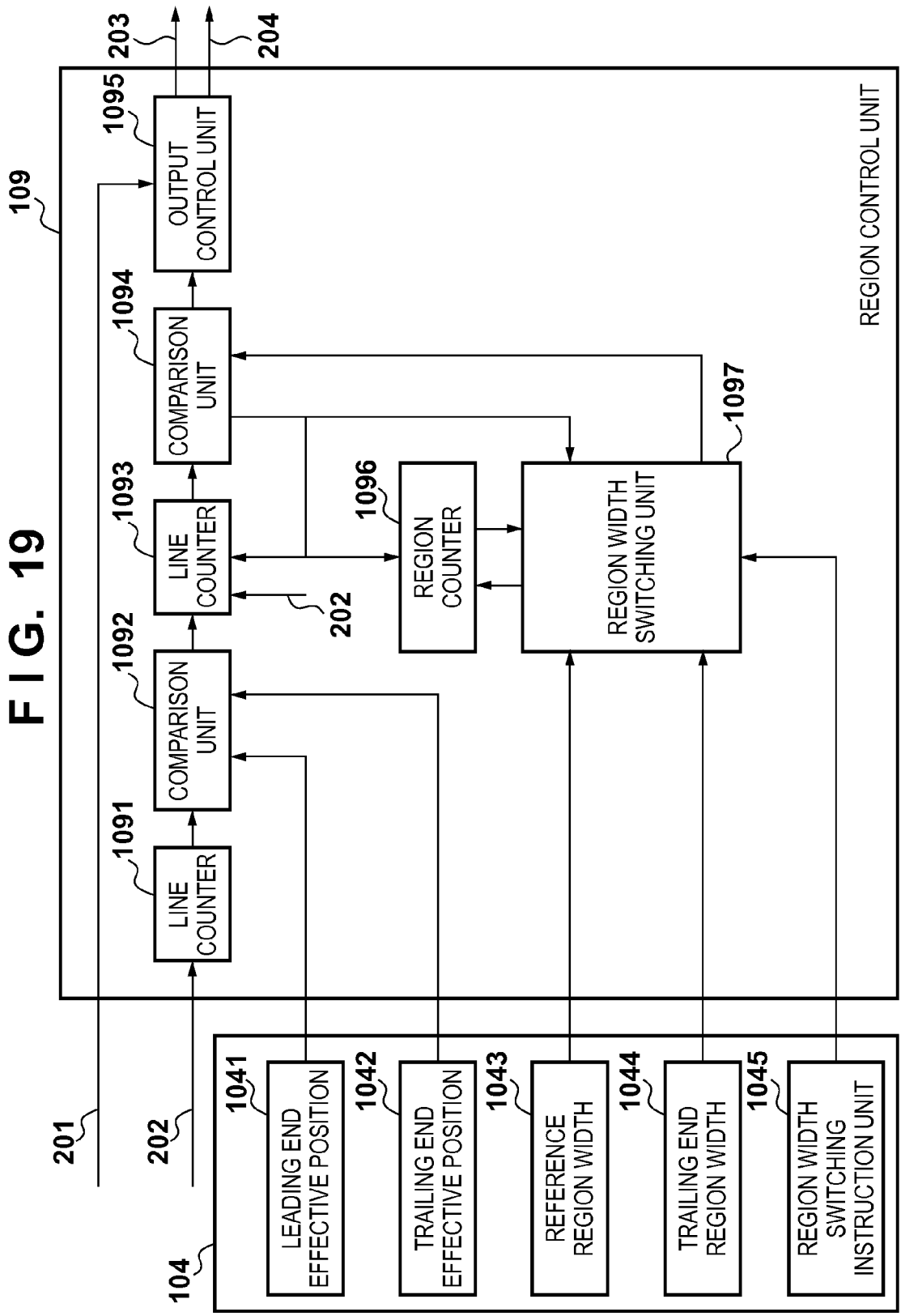
FIG. 19 is a block diagram showing a control procedure for a region control unit 109 in the third embodiment.

The internal arrangement of a frequency distribution generation unit 110 in this embodiment is the same as that in the first embodiment. The internal arrangement of a region control unit 109, a control procedure in the unit, and a control procedure in a CPU 101 in the third embodiment differ from those in the first embodiment. FIG. 19 shows the arrangement of the region control unit 109 in a case in which the third embodiment is implemented. The same reference numerals as in FIG. 19 denote the same components of the region control unit 109 in the first embodiment.

The respective constituent elements which are arranged in the region control unit 109 to implement this embodiment will be described. Reference numerals 1044 and 1045 denote new registers which are arranged in a register 104 and required to implement the third embodiment. Reference numeral 1044 denotes a trailing end region width to be applied to a document trailing end portion; and 1045, a region width switching instruction unit for issuing a region width switching instruction to be applied to the document trailing end portion. Note that the trailing end region width 1044 and the region width switching instruction unit 1045 allow the CPU 101 to make settings. Reference numeral 1096 denotes a region counter which counts at the timing when the count value of a line counter 1093 reaches the set value of a reference region width 1043 or the set value of the trailing end region width 1044; and 1097, a region width switching unit which performs selective output control on the set value of the reference region width 1043 and the set value of the trailing end region width 1044 in accordance with the count value of the region counter 1096 and the value of the region width switching instruction unit 1045.

The necessity of the third embodiment will be described by using other drawings. FIGS. 20A, 20B, and 20C show the relationship between the region segmented state of document image data 603 and the reference region width 1043 after the detection of the trailing end of the document image by a trailing end detection sensor 107. Referring to FIGS. 20A, 20B, and 20C, as in the above description, each white rectangular region indicates a read image data region reflected in a first region frequency distribution 1103, and each black rectangular region indicates a read image data region reflected in a second region frequency distribution 1104. Assume that the apparatus starts region switching from a white rectangular region.

Referring to FIG. 20A, reference numeral 2001 denotes the timing when the trailing end detection sensor 107 has detected the trailing end of a document page; and 2002, the amount of read image data input after the detection of the trailing end of the document page. Note that FIG. 20A shows a case in which the amount 2002 of read image data input after the detection of the trailing end of the document page is equal to or more than two regions of the set value of the reference region width 1043, and the number of pixels in the sub-scanning direction from which the influence of the shadow of the leading end of the document page is removed is not 2N times the reference region width 1043. Reference numeral 2003 denotes the number of pixels in the sub-scanning direction which conforms with the set value of the reference region width 1043. The first embodiment is configured to perform control to equalize the numbers of white and black rectangular regions reflected in frequency distributions to equalize the sample counts of frequency distributions of a plurality of regions in the sub-scanning direction and acquire no frequency distribution of a region including the shadow of the trailing end of the document page. FIG. 20B shows the result.

Referring to FIG. 20B, reference numeral 2004 denotes the boundary between regions reflected in the first region frequency distribution 1103 and the second region frequency distribution 1104. As shown in FIG. 20B, the image data (the gray hatched region) input after the boundary 2004 is equal to or more than one region of the set value of the reference region width 1043. As the set value of the reference region width 1043 increases, the amount of image data which is not reflected in a frequency distribution increases. This may lead to the inability to perform an accurate analysis.

Even in the state shown in FIG. 20A, the third embodiment is configured to equalize the frequency distribution sample counts of a plurality of regions in the sub-scanning direction and increase the amount of image data to be reflected in frequency distributions. Note that the implementation of the third embodiment requires control by the CPU 101 and control by region control unit 109, and hence the corresponding procedures will be described in detail by using other drawings.

Figure 21:
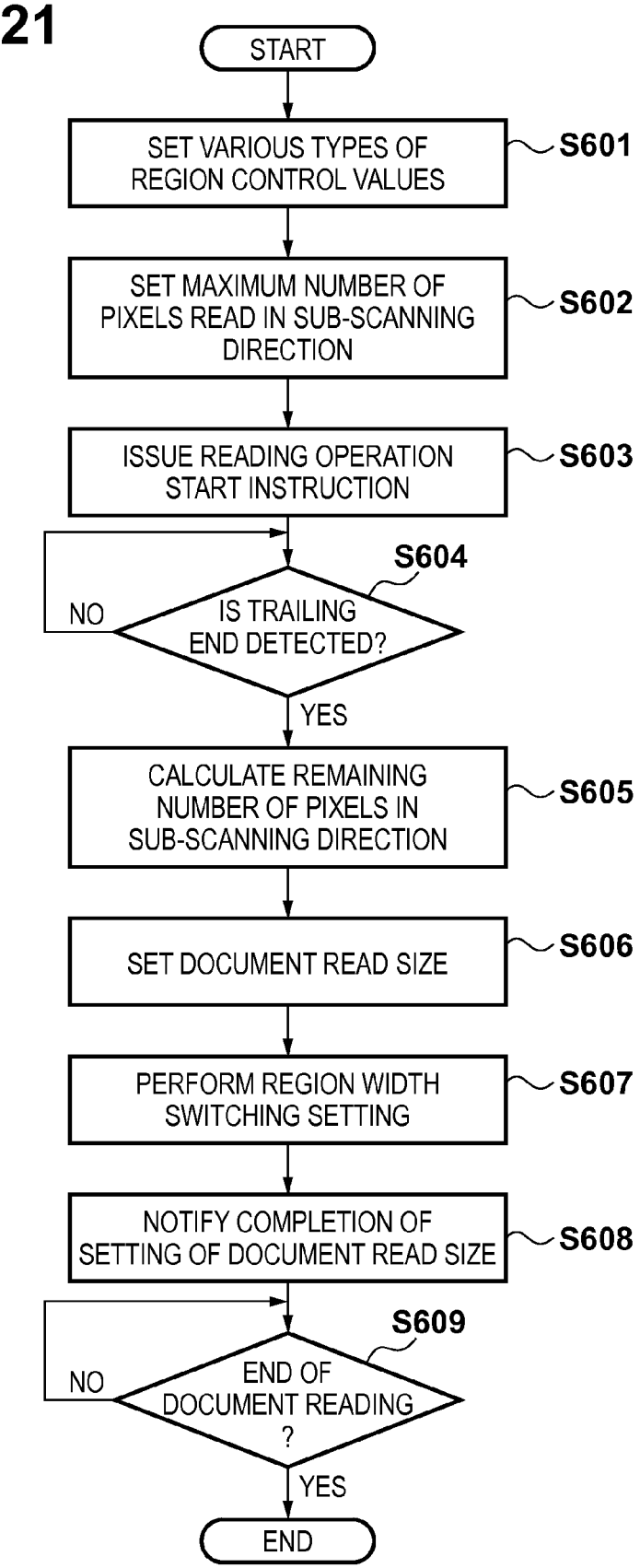
FIG. 21 is a flowchart showing a control procedure for a CPU 101 in the third embodiment.

FIG. 21 is a flowchart showing a control procedure in the CPU 101 in the third embodiment. At the startup of the apparatus in the embodiment, the CPU 101 performs setting necessary for region control by the frequency distribution generation unit, that is, a leading end effective position 1041, a trailing end effective position 1042, the reference region width 1043, and the trailing end region width 1044 (step S601). Note that since a document size is not determined at the start of document image data reading when an ADF 105 performs reading operation, the CPU 101 sets the trailing end effective position 1042 to the maximum set value which can be set in step S601. The CPU 101 then sets the number of pixels read in the sub-scanning direction of the document image data (step S602). Note that like setting of the trailing end effective position 1042 in step S601, the CPU 101 sets the number of pixels read in the sub-scanning direction to the maximum set value which can be set in step S602 because the document size is not determined at the start of reading operation.

Upon completing the above setting, the CPU 101 issues a reading operation start instruction (step S603). The CPU 101 does not change the set values set in steps S601 and S602 until the trailing end detection sensor 107 detects a trailing end during reading operation for the document image data 603 (NO in step S604). Upon receiving a trailing end detection signal concerning the document image data 603 from the trailing end detection sensor 107 (YES in step S604), the CPU 101 calculates the remaining number of pixels in the sub-scanning direction in accordance with the mechanical arrangement of the image processing apparatus and parameters at the time of operation such as the reading resolution of the document image data 603 (step S605). More specifically, the CPU 101 determines the number of pixels read from the region from the position of the trailing end detection sensor 107 to a reading position 604 in the sub-scanning direction, as a document image size, based on parameters such as a resolution at the time of document reading operation.

Upon completing the calculation of the remaining number of pixels read in the sub-scanning direction in step S605, the CPU 101 sets the trailing end effective position 1042 of the document image data and the number of pixels read in the sub-scanning direction upon determination of the document size (step S606). That is, the CPU 101 sets a value for the setting target, for which the maximum value which can be set is set in step S601, in accordance with the determined document size. Since the trailing end detection sensor 107 has detected the trailing end of the document page, the CPU 101 performs setting to subsequently switch frequency distribution generation region units. That is, the CPU 101 performs setting to switch the set value of the reference region width 1043, which has been used so far, to the trailing end region width 1044. The CPU 101 performs this setting by performing setting for the region width switching instruction unit 1045. Assume that the region width switching instruction unit 1045 before the detection of the trailing end by the trailing end detection sensor 107 is 0. In this case, when the trailing end detection sensor 107 detects a trailing end, the CPU 101 switches the region width switching instruction unit 1045 to 1 (step S607). Although this description is based on the assumption that the reference region width 1043 differs in arrangement from the trailing end region width 1044, the present invention is not limited to this. The apparatus may have an arrangement configured to include one region width setting holding arrangement and allow the CPU 101 to overwrite the setting as long as the arrangement is guaranteed to be free from any trouble in accurate frequency distribution generation by a control procedure in the CPU 101 or region width switching control. Upon completing region width switching setting for frequency distribution generation to be applied after the detection of the trailing end of a document page, the CPU 101 notifies the completion of setting to indicate the completion of setting of the number of pixels read in the sub-scanning direction upon determination of a document size (step S608). The CPU 101 waits for the notification of the completion of reading of document image data, and terminates the control procedure at the time of receiving the notification (step S609).

Figure 22:
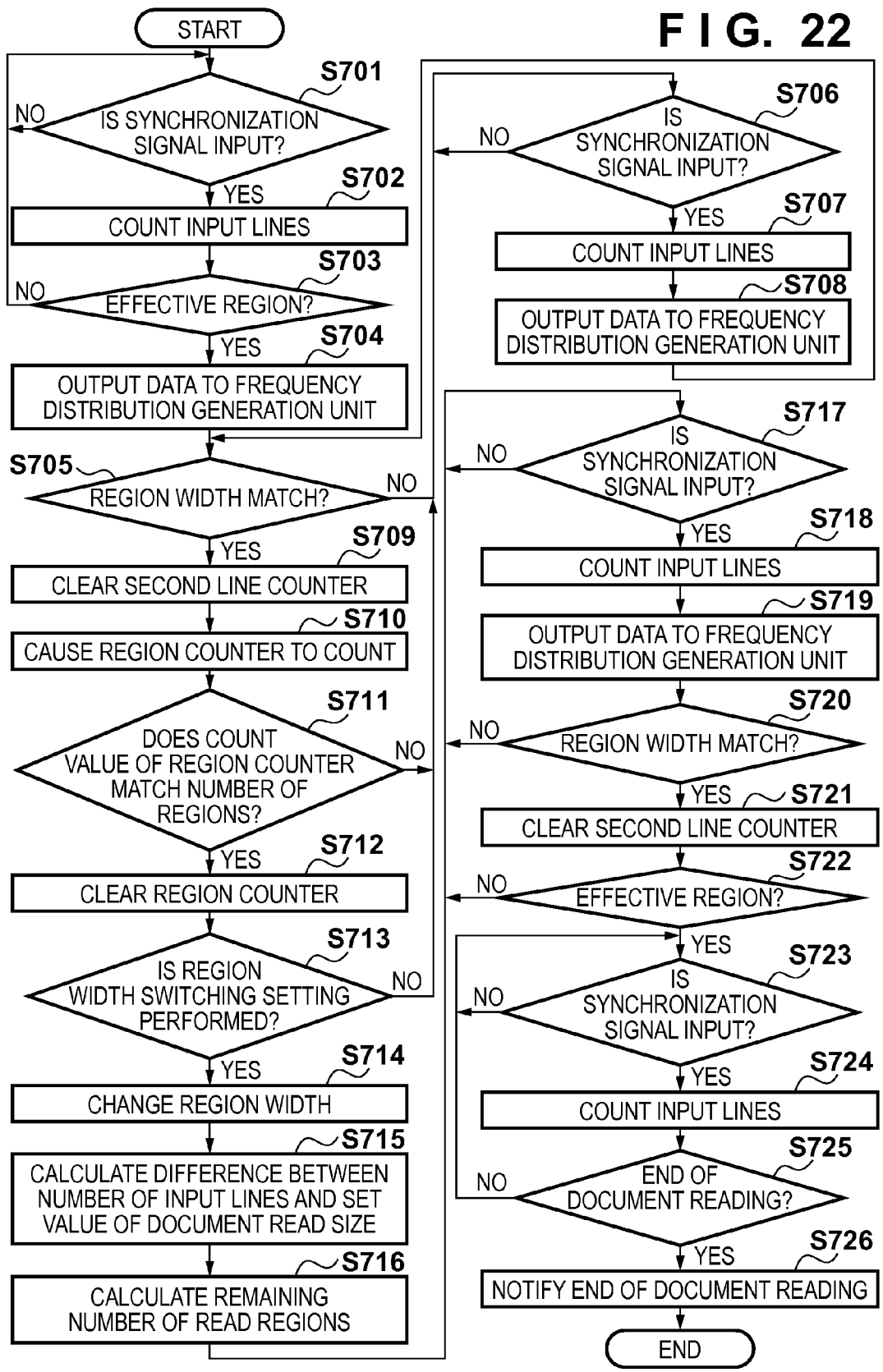
FIG. 22 is flowchart showing a control procedure for the region control unit 109 in the third embodiment.

An operation procedure in the region control unit 109 under the control of the CPU 101 shown in FIG. 21 will be described next. FIG. 22 is flowchart showing a control procedure in the region control unit 109. When the region control unit 109 issues a reading operation start instruction for document image data under the control of the CPU 101 in step S603, the reading device 106 starts reading the document image data 603. The reading I/F control unit 108 converts the image data read by the reading device 106 into digital data and outputs it to the region control unit 109. At this time, the reading I/F control unit 108 outputs the digitally converted image data, together with the synchronization signal 202. The region control unit 109 does not start region control until receiving the synchronization signal 202 from the reading I/F control unit 108 (NO in step S701). Upon receiving the synchronization signal 202 from the reading I/F control unit 108 (YES in step S701), a line counter 1091 counts the number of input lines (step S702). If the count value obtained in step S702 has not reached the set value of the leading end effective position 1041 set by the CPU 101 in step S601, the region control unit 109 waits for the input of the next synchronization signal 202 (NO in step S703). The control performed by the region control unit 109 in step S703 can eliminate the influence of the shadow included in the leading end read image data of the document image data. If the input line count value obtained in step S702 has reached the set value of the leading end effective position 1041, the region control unit 109 shifts to the next control (YES in step S703). That is, the region control unit 109 shifts the process to control for making read image data after the input of the synchronization signal 202 be image data to be reflected in frequency distribution generation. The line counter 1093 receives an output signal from the comparison unit 1092 and counts the number of lines every time the synchronization signal 202 is input. The comparison unit 1094 compares the value counted by the line counter 1093. Since the reference region width 1043 corresponds to the setting of a plurality of pixels in the sub-scanning direction, the count value of the line counter 1093 does not match the set value of the reference region width 1043 at the start of reading operation. Therefore, the apparatus does not perform any specific control by the comparison unit 1094. On the other hand, after the input of the synchronization signal 202, an output control unit 1095 outputs the region identification signal 203 and image data 204, input to the region control unit 109, to the frequency distribution generation unit 110 (step S704).

The comparison unit 1094 compares the count value of the line counter 1093, which counts every time the synchronization signal 202 is input, with the value of the reference region width 1043. With this comparison control, the apparatus performs determination control to determine whether image data after the input of the synchronization signal 202 belongs to a first region or second region. More specifically, the apparatus performs control based on the check made by the comparison unit 1094 whether the count value of the line counter 1093 matches the set value of the reference region width 1043 (step S705). If the count value of the line counter 1093 does not match the set value of the reference region width 1043 (NO in step S705), the region control unit 109 waits for the input of the next synchronization signal 202 (NO in step S706). When the next synchronization signal 202 is input (step S706), the line counter 1093 counts the number of input lines (step S707). The output control unit 1095 then outputs read image data after the input of the synchronization signal 202 to the frequency distribution generation unit 110, together with a region identification signal 203. The apparatus continuously performs the processing from step S706 to step S708 until the count value of the line counter 1093 matches the reference region width 1043 (NO in step S705).

If the comparison unit 1094 determines that the count value of the line counter 1093 matches the set value of the reference region width 1043 (YES in step S705), the comparison unit 1094 outputs a signal indicating the match to the line counter 1093, the region counter 1096, and the region width switching unit 1097. Upon receiving the signal, the line counter 1093 initializes the count value to handle subsequently input image data as data belonging to a region different from the immediately preceding input region (step S709). The region counter 1096 receives the signal and counts (step S710). According to this description, since the frequency distributions generated by the frequency distribution generation unit 110 concern two regions in the sub-scanning direction, the region counter 1096 is a 1-bit counter. That is, the region counter 1096 indicates 0 while the line counter 1093 and the comparison unit 1094 handle the read image data of a first region as target data, and indicates 1 while they handle the read image data of a second region as target data.

When a value from the region counter 1096 shows a state that the second region frequency distribution 1104 is controlled and the comparison unit 1094 outputs a match signal, the sample count of the first region frequency distribution 1103 is equal to that of the second region frequency distribution 1104. Therefore, the region width switching unit 1097 checks whether the value indicated by the region counter 1096 shows a state that the second region frequency distribution 1104 is controlled, at the timing when the comparison unit 1094 outputs the match signal. If the value indicated by the region counter 1096 shows the state that the first region frequency distribution 1103 is controlled at the timing when the comparison unit 1094 outputs the match signal (NO in step S711), the apparatus performs the processing from step S706 to step S708.

Upon determining that the value indicated by the region counter 1096 controls the second region frequency distribution 1104 at the timing when the comparison unit 1094 outputs a match signal, the region width switching unit 1097 outputs a count value clear signal to the region counter 1096. Upon receiving the clear signal from the region width switching unit 1097, the region counter 1096 clears the count value (step S712). The region width switching unit 1097 then checks whether the CPU 101 has performed region width switching setting in step S607 (step S713). More specifically, the region width switching unit 1097 checks whether the CPU 101 has performed setting for the region width switching instruction unit 1045. If the CPU 101 has not performed region width switching setting (NO in step S713), the apparatus continuously performs the processing from step S706 to step S708 and the processing from step S705 to step S712 again.

Upon determining in step S713 that the CPU 101 has performed region width switching setting, that is, the CPU 101 has performed setting for the region width switching instruction unit 1045, the region width switching unit 1097 shifts to the next control (YES in step S713). That the CPU 101 has performed setting for the region width switching instruction unit 1045 means that the trailing end detection sensor 107 has detected the trailing end of the document page. Therefore, the region width switching unit 1097 performs region control to switch to the second region width, that is, the trailing end region width 1044 (step S714).

The region width switching unit 1097 calculates the number of pixels of the remaining read image data in the sub-scanning direction by using the count value of the line counter 1091, the set value of the leading end effective position 1041, and the set value of the trailing end effective position 1042 (step S715). The region width switching unit 1097 then calculates the remaining number of regions, which allow to equalize the frequency distribution sample counts of the first region frequency distribution 1103 and second region frequency distribution 1104, based on the calculated number of pixels in the sub-scanning direction and the set value of the trailing end region width 1044 (step S716). That is, the region width switching unit 1097 obtains the number of regions which allow to equalize the frequency distribution sample counts of the first region frequency distribution 1103 and second region frequency distribution 1104 by using the second region width set to the trailing end region width 1044.

When the region width switching unit 1097 obtains the remaining number of regions in step S716, the region control unit 109 waits for the input of the next synchronization signal 202 (step S717). When the region control unit 109 receives the synchronization signal 202, the line counter 1091 and the line counter 1093 count (step S718). The output control unit 1095 then outputs the read image data input after the input of the synchronization signal 202 to the frequency distribution generation unit 110 (step S719).

The comparison unit 1094 compares the second region width, that is, the set value of the trailing end region width 1044, with the count value of the line counter 1093 to perform region control (step S720). If the count value of the line counter 1093 does not match the trailing end region width 1044 (NO in step S720), the apparatus continuously performs the processing from step S717 to step S719. Upon determining in step S720 that the set value of the trailing end region width 1044 matches the count value of the line counter 1093, the comparison unit 1094 outputs a match signal. Upon receiving the match signal, the line counter 1093 initializes the count value (step S721).

If the count value of the line counter 1091 is equal to or less than the number of pixels in the sub-scanning direction which corresponds to the remaining number of regions in step S716, the region control unit 109 determines that the corresponding data is effective region data, and continuously performs the processing from step S717 to step S721 (NO in step S722). If the count value of the line counter 1091 exceeds the number of pixels in the sub-scanning direction which corresponds to the remaining number of regions in step S716 (YES in step S722), the region control unit 109 determines that the subsequently input read image data is ineffective region data. That is, the region control unit 109 determines, even with the set value of the trailing end region width 1044, that the subsequently input image data is not image data to be reflected in frequency distribution generation. Subsequently, the region control unit 109 counts the synchronization signal 202 (steps S723 and S724), and continuously performs the processing in steps S723 and S724 until the count value of the line counter 1091 becomes equal to the number of pixels read in the sub-scanning direction which is set in step S606 executed by the CPU 101 (NO in step S725). If the region control unit 109 determines that the count value of the line counter 1091 matches the number of pixels read in the sub-scanning direction which is set in step S606 executed by the CPU 101, the region control unit 109 determines that the document reading operation is complete (YES in step S725). The region control unit 109 then outputs a document reading end notification to the CPU 101 (step S726).

FIG. 20C shows a change in the frequency distribution of the read image data shown in FIG. 20A due to the control procedure shown in FIG. 21 which is executed by the CPU 101 and the control procedure shown in FIG. 22 which is executed by the region control unit 109. Referring to FIG. 20C, reference numeral 2005 denotes the number of pixels in the sub-scanning direction based on the set value of the trailing end region width 1044; and 2006, the boundary between image data reflected in the frequency distribution by the frequency distribution generation unit 110. In the first embodiment, the read image data input after the position denoted by reference numeral 2004 include many image data (data indicated by the gray hatching) which are not reflected in frequency distributions. In the third embodiment shown in FIG. 20C, the read image data input after the position denoted by reference numeral 2006 include fewer gray hatched portions. This is the effect obtained by switching the reference region width 1043 as a unit for the generation of frequency distributions to the trailing end region width 1044 for the document trailing end upon detection of the document trailing end by the trailing end detection sensor 107. That is, the apparatus performs control to minimize read image data which is not reflected in frequency distribution generation by decreasing the set value of the trailing end region width 1044 relative to the set value of the reference region width 1043. Even in this case, it is possible to equalize the frequency distribution sample counts of the first region frequency distribution 1103 and second region frequency distribution by equally controlling the numbers of white and black rectangular regions complying with the trailing end region width 1044.

Although the above description is based on the assumption that the reference region width 1043 differs from the trailing end region width 1044 in terms of arrangement, the present invention is not limited to this. It is important in the third embodiment to decrease the region width as a reference for frequency distribution generation, after the detection of the trailing end by the trailing end detection sensor 107, relative to the region width used before the detection of the trailing end. Therefore, the apparatus may perform control to decrease the value of the reference region width 1043 used so far by a predetermined factor after the detection of the trailing end by the trailing end detection sensor 107.

As has been described above, according to the third embodiment, it is possible to further reduce read image data which is not reflected in frequency distributions by switching a reference region width for frequency distribution generation after the detection of the document trailing end in a case in which the frequency distribution sample counts of a plurality of regions in the sub-scanning direction are equalized.

[Other Embodiments]

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-276117, filed Dec. 18, 2012, which is hereby incorporated by reference herein in its entirety.

What is claimed is:

1. An image processing apparatus comprising:
a reading unit configured to read a document from an end portion of the document for each line in a predetermined direction and output image data;
a detection unit configured to detect a size of the document in the predetermined direction;
an obtainment unit configured to obtain a frequency distribution of pixel values by using output image data, for each reference region having a predetermined width in the predetermined direction, while reading the document by using the reading unit;
a totalization unit configured to segment a frequency distribution obtained by the obtainment unit for each of the reference regions into a predetermined number of groups, and to totalize and store the frequency distribution for each of the groups;
a control unit configured to control totalization of the frequency distribution obtained for each of the reference regions performed by the totalization unit, upon detection of the size of the document by the detection unit, so as to equalize the numbers of the reference regions sorted to the respective groups by using the size of the document, a width of the reference region, and the number of the groups; and
an analysis unit configured to analyze the input image data by using the frequency distribution totalized by the totalization unit for each group, wherein totalization of the frequency distribution obtained for each of the reference regions is controlled by the control unit so as to equalize the numbers of the reference regions sorted to the respective groups.

2. The apparatus according to claim 1, further comprising a convey unit configured to convey a document in the predetermined direction,
wherein the detection unit detects an end portion of a document in a conveying direction of the convey unit, the reading unit performs reading at a position spaced apart from a detection position of the detection unit by a predetermined distance in the conveying direction, and the control unit configured to control the totalization unit, upon detection of a trailing end of a document by the detection unit, so as not to totalize any frequency distribution concerning a portion, of an image on the document between the reading position and the detection position, which corresponds to a remainder obtained by equalizing the numbers of the reference regions of the respective groups.

3. The apparatus according to claim 2, wherein the control unit controls the totalization unit to totalize the frequency distribution concerning a effective region from which a predetermined width of an end portion of the document in the conveying direction is removed.

4. The apparatus according to claim 1, wherein the number of the groups is two.

5. The apparatus according to claim 1, further comprising a storage unit configured to store image data read by the reading unit, wherein the totalization unit totalizes a frequency distribution concerning image data read by the reading unit, and the storage unit stores the read image data.

6. The apparatus according to claim 1, wherein the totalization unit includes a temporary storage unit configured to store frequency distributions concerning a set of reference regions temporarily, with each set including one each of reference regions belonging to the respective groups, until completion of totalization, and reflect the frequency distributions in a frequency distribution collectively upon completion of totalization of the frequency distributions concerning the set of reference regions.

7. The apparatus according to claim 1, wherein the control unit switches a width of the reference region to a smaller width upon detection of a trailing end of the document by the detection unit.

8. The apparatus according to claim 1, wherein the analysis unit determines, by using the frequency distribution totalized by the totalization unit, whether the document read by the reading unit is a blank page.

9. An image processing apparatus comprising:

a reading unit configured to read a document and output image data;

an obtainment unit configured to obtain a frequency distribution of pixel values by using the image data output by the reading unit upon reading of the document for each reference region, of the image data, which has a predetermined area;

a totalization unit configured to segment the frequency distribution obtained by the obtainment unit for each of the reference regions into a predetermined number of groups so as to equalize the numbers of the reference regions, and to totalize and store the frequency distribution for each of the groups; and an analysis unit configured to analyze the input image data by using the frequency distribution totalized by the totalization unit for each group, wherein totalization of the frequency distribution obtained for each of the reference regions is controlled so as to equalize the numbers of the reference regions sorted to the respective groups.

10. An image processing method executed by an image processing apparatus, the method comprising:

reading a document from an end portion of the document for each line in a predetermined direction and outputting image data;

detecting a size of the document in the predetermined direction;

obtaining a frequency distribution of pixel values by using output image data, for each reference region having a predetermined width in the predetermined direction, while reading the document in the reading;

segmenting a frequency distribution obtained in the obtaining for each of the reference regions into a predetermined number of groups, and totalizing and storing the frequency distribution for each of the groups;

controlling totalization of the frequency distribution obtained for each of the reference regions performed in the totalization, upon detection of the size of the document in the detecting, so as to equalize the numbers of the reference regions sorted to the respective groups by using the size of the document, a width of the reference region, and the number of the groups; and analyzing the input image data by using the frequency distribution totalized for each group, wherein totalization of the frequency distribution obtained for each of the reference regions is controlled so as to equalize the numbers of the reference regions sorted to the respective groups.

11. A non-transitory computer-readable medium recording a program for causing a computer to execute an image processing method defined in claim 10.

12. An image processing method executed by an image processing apparatus, the method comprising:

reading a document and outputting image data;

obtaining a frequency distribution of pixel values by using the image data output in the reading upon reading of the document for each reference region, of the image data, which has a predetermined area;

segmenting the frequency distribution obtained in the obtaining for each of the reference regions into a predetermined number of groups so as to equalize the numbers of the reference regions, and totalizing and storing the frequency distribution for each of the groups; and analyzing the input image data by using the frequency distribution totalized for each group, wherein totalization of the frequency distribution obtained for each of the reference regions is controlled so as to equalize the numbers of the reference regions sorted to the respective groups.

13. A non-transitory computer-readable medium recording a program for causing a computer to execute an image processing method defined in claim 12.

* * * * *